United States Patent
Campaña Aguilera et al.

(10) Patent No.: US 9,724,587 B2
(45) Date of Patent: Aug. 8, 2017

(54) METHOD AND SYSTEM TO ASSIST IN PLAYER DEVELOPMENT

(71) Applicant: Team Sport IP, LLC, Miami, FL (US)

(72) Inventors: Jose Campaña Aguilera, Barcelona (ES); Alejandro Garcia del Castillo, Toledo (ES); Joseph Keppeln, London (GB)

(73) Assignee: Team Sport IP, LLC, Miami, FL (US)

( * ) Notice: Subject to any disclaimer, the term of this patent is extended or adjusted under 35 U.S.C. 154(b) by 154 days.

(21) Appl. No.: 14/543,599

(22) Filed: Nov. 17, 2014

(65) Prior Publication Data

US 2015/0142142 A1   May 21, 2015

Related U.S. Application Data

(60) Provisional application No. 61/905,261, filed on Nov. 17, 2013.

(51) Int. Cl.
*A63B 71/06* (2006.01)
*G06Q 10/06* (2012.01)

(52) U.S. Cl.
CPC .......... *A63B 71/06* (2013.01); *G06Q 10/063* (2013.01); *G06Q 10/0631* (2013.01); *G06Q 10/0639* (2013.01)

(58) Field of Classification Search
USPC ................................. 701/91–93; 700/91–93
See application file for complete search history.

(56) References Cited

U.S. PATENT DOCUMENTS

| | | | |
|---|---|---|---|
| 8,177,634 B2 * | 5/2012 | Herrmann | G06Q 30/02 463/25 |
| 8,308,615 B2 | 11/2012 | Vitolo et al. | |
| 8,346,593 B2 | 1/2013 | Fanelli et al. | |
| 8,418,085 B2 | 4/2013 | Snook et al. | |
| 8,489,457 B2 | 7/2013 | Masewicz et al. | |
| 8,532,798 B2 | 9/2013 | Ferraro, III et al. | |
| 8,533,001 B2 | 9/2013 | Skiba | |
| 9,087,454 B2 * | 7/2015 | Crivello | G09B 19/003 |
| 2004/0162803 A1 | 8/2004 | Rhoads | |
| 2004/0210661 A1 | 10/2004 | Thompson | |
| 2004/0243261 A1 | 12/2004 | King | |

(Continued)

OTHER PUBLICATIONS

International Search Report and Written Opinion for Application No. PCT/US2014/065965 mailed Feb. 26, 2015.

(Continued)

*Primary Examiner* — Ronald Laneau
(74) *Attorney, Agent, or Firm* — Merchant & Gould P.C.

(57) ABSTRACT

A system for assisting in player development is disclosed. The system includes a server maintaining a database including a plurality of player development records, each player development record including at least training data, competition data, and biographic data. The system also includes an application hosted by the server, the application including a user interface and an automated player performance application, the automated player performance application being configured to generate a player development profile for display in the user interface, the player development profile being based at least in part on performance trends in the player development record and also including one or more recommendations or comparisons.

25 Claims, 32 Drawing Sheets

(56) References Cited

U.S. PATENT DOCUMENTS

| | | | |
|---|---|---|---|
| 2005/0001837 | A1 | 1/2005 | Shannon |
| 2005/0209717 | A1 | 9/2005 | Flint et al. |
| 2008/0147422 | A1 | 6/2008 | Van Buskirk |
| 2008/0176612 | A1 | 7/2008 | McCullough |
| 2009/0099924 | A1 | 4/2009 | Lensch et al. |
| 2010/0057848 | A1* | 3/2010 | Mangold ............. G06F 19/3481 709/203 |
| 2010/0279800 | A1 | 11/2010 | Zuger |
| 2011/0281639 | A1* | 11/2011 | Porat ........................ A63F 13/80 463/23 |
| 2012/0023163 | A1* | 1/2012 | Mangold ................ A63B 69/00 709/203 |
| 2012/0095578 | A1 | 4/2012 | Tchao et al. |
| 2012/0130515 | A1 | 5/2012 | Homsi et al. |
| 2012/0144301 | A1* | 6/2012 | Bass .................. G09B 19/0092 715/709 |
| 2012/0216115 | A1 | 8/2012 | Lorenceau |
| 2013/0218310 | A1 | 8/2013 | Johnson |
| 2013/0236868 | A1 | 9/2013 | Erkkila |
| 2016/0133152 | A1* | 5/2016 | Arif ......................... G09B 5/00 434/247 |

OTHER PUBLICATIONS

Fitstats Technologies, Inc., "Fitstats Performance", Retrieved on: Aug. 4, 2015, Available at: http://www.fitstats.web.com/fitstats-performance/.
Fitstats Technologies, Inc., "AthleteMonitoring—This is Athlete Monitoring Made easy", Retrieved on: Aug. 4, 2015, Available at: http://www.AthleteMonitoring.com.
AMP, Inc., "Athlete Management Platform—Why AMP Sport®?—The Intersection of Athlete Management and Sport Science", Retrieved on: Aug. 5, 2015, Available at: http://www.AMPSport.com/AthleteManagementThatWorks.
Keffer Development Services, "The Athletic Trainer System®", Retrieved on: Aug. 4, 2015, Available at: http://athletictrainersystem.com.
Fusion Sport Headquarters, "FusionSport—Smartabase—Revolutionizing Athlete Data Management", Retrieved on: Aug. 5, 2015, Available at: http://fusionsport.com/products/smartbase-athlete-data-management-software.
Tennis Learning Management Systems Corporation, "TennisLMS/College Edition—Long Term Player Development Software", Retrieved on: Aug. 5, 2015, Available at: http://www.tennislms.com.
Assembly, "Create Events and Connect Sport Players", Retrieved on: Dec. 17, 2015, Available at: https://assembly.com/sportiz.
Fanatix, "Capture Moments in Sport and Share", Retrieved on: Dec. 17, 2015, Available at: http:/www.fanatix.com/.
Fancred, "Share Your Sport Identity with Others", Retrieved on: Dec. 17, 2015, Available at: https://fancred.com/.
Graybo, "Share Sport Video Moments with Others", Retrieved on: Dec. 17, 2015, Available at: http://about.grabyo.com/.
Sportlobster, "Sport Social Network Chat and News", Retrieved on: Dec. 17, 2015, Available at: http://www.sportlobster.com/discover.
Setteo, "Play Racquetball with Other Players", Retrieved on: Dec. 18, 2015, Available at: https://www.setteo.com/.
Bleacher Report, "Team Stream Real Time News of Your Favorite Team", Retrieved on: Dec. 18, 2015, Available at: http://bleacherreport.com/mobile.
OnCourt, "Comparison Data of Sport Players", Retrieved on: Dec. 18, 2015, Available at: http://www.oncourt.info/.
IBM, "Data Analysis of Wimbledon and Grand Slams", Retrieved on: Dec. 18, 2015, Available at: http://www.-05.ibm.com/innovation/uk/wimbledon/howitworks.html.
TennisJUNIORtv, "Tennis Video on Demand for followers of Young Players", Retrieved on: Dec. 18, 2015, Available at: http://tennisjuniortv.com/introduccion.asp.
Whistle Sports, "Sport Media and News Production", Retrieved on: Dec. 18, 2015, Available at: http://whistlesports.com/.
Global Tennis Network, LLC, "Global Tennis Network to Create Tournaments", Retrieved on: Dec. 18, 2015, Available at: https://www.globaltennisnetwork.com/.
Tennis Round, "Tennis Partner Near You", Retrieved on: Dec. 18, 2015, Available at: http://www.tennisround.com/.
Tennis Buddy, "Tennis Buddy Location", Retrieved on: Dec. 18, 2015, Available at: http://tennisbuddy.app.com/.
Tie Tennis, "Location of Players and Installations in Relation to You", Retrieved on: Dec. 18, 2015, Available at: https://www.tietennis.com/Default.aspx.
Startup Energy SIA, "Tennis Battle-Compare, Play and Share with Other Sport Players", Retrieved on: Dec. 18, 2015, Available at: http://tennisbattle.com/en.
R2 Sports, "Tournament Software and Management Application", Retrieved on: Dec. 18, 2015, Available at: http://www.r2sports.com/tournament-software.asp.
iTUSA Sports, "iTUSA Tennis—Various Training Systems for Analysis of Players", Retrieved on: Dec. 18, 2015, Available at: http://itusatennis.com/services-players.
kWare Systems, Inc., "interTennis—Creates Tournaments and Ladders", Retrieved on: Dec. 18, 2015, Available at: http://www.intertennis.com/.
SportLogic Pty Ltd. , "Business Management of Sport Centers", Retrieved on: Dec. 18, 2015, Available at: http://sportlogic.com.an/.
TennisPoint, "Tennis Teams and Playing Schedules", Retrieved on: Dec. 18, 2015, Available at: http://www.tennispoint.com//.
TennisConnect, "Tennis Organizations of the Club", Retrieved on: Dec. 18, 2015, Available at: http://www.tennisconnect.com/.
Avanza Tecnología, "Sofware Development of Club Management Tools", Retrieved on: Dec. 18, 2015, Available at: http://www.avanzatechnologia.es/index.html.
Motus Global, "Movement Analysis Software", Retrieved on: Dec. 18, 2015, Available at: http://www.motusglobal.com/.
V1 Sports, "Sport Movement Analysis", Retrieved on: Dec. 18, 2015, Available at: http://www.v1sports.com/.
Video4coach, "Video Skill Capture", Retrieved on: Dec. 18, 2015, Available at: http://video4coach.com/.
Prozone Sports, "Sport Data Performance Analysis", Retrieved on: Dec. 18, 2015, Available at: http://www.prozonesports.com/.
Atlas Wearables, "Wearable's that Control Movement", Retrieved on: Dec. 18, 2015, Available at: https://www.atlaswearables.com/product/.
Kitris AG, "Tennis Tracking and Analysis System", Retrieved on: Dec. 18, 2015, Available at: http://www.kitris.ch/en/index.php.
Dartfish, "Video Analysis", Retrieved on: Dec. 18, 2015, Available at: http://www.dartfish.com/.
Sportvision, Inc., "Video Analysis", Retrieved on: Dec. 18, 2015, Available at: http://www.sportvision.com/.
Playsight Interactive Ltd., "Player Video Capture of Movements", Retrieved on: Dec. 18, 2015, Available at: http://www.playsight.com/Main.aspx.
Up My Game, "Video Analysis for Coaches to Interact", Retrieved on: Dec. 18, 2015, Available at: https://upmygame.com/.

* cited by examiner

FIG. 23

METHOD AND SYSTEM TO ASSIST IN PLAYER DEVELOPMENT

CROSS REFERENCE TO RELATED APPLICATIONS

This application claims priority to U.S. Provisional Patent Application Ser. No. 61/905,261, filed Nov. 17, 2013, the disclosure of which is incorporated herein by reference in its entirety.

BACKGROUND

Tracking sports player development over a time period has been known to be a difficult task. Tracking a variety of different metrics can help coaches and trainers better tailor the training and lifestyle of the athlete to ensure performance growth in the athlete. A variety of different systems to track player performance are known. For example, some coaches keep performance attribute data primarily in the form of handwritten notes. This approach is disadvantageous because the data is not readily available to the athlete, the athlete's parents (in the case of minors), trainers, team managers, sponsors, and/or other stakeholder's associated with the developing athlete. In professional sports, rankings and statistics are often managed and hosted by large media outlets. However, for amateur players wishing to become professional, player development data is often only found in basic forms often on webpages and blogs. This creates an inherent drawback for younger players and trainers.

Furthermore, because media typically maintain and manage player records, such player records are typically outside of the control of a player and his or her trainer. Furthermore, such player records are also typically only managed for competition-related occurrences, because media typically does not monitor sporting performance in non-competition practice scenarios, or for non-professional athletes.

In particular contexts, ball games are very popular and tennis in particular has become one of the major popular and professional sports. For the non-professional tennis players there are several ways of improving their game. Training with a tennis coach, self-training by using a ball machine or a return-wall, books and videos all improve mainly the technical skills. Tactical coaching however is not available for the nonprofessional player, although many matches are decided by tactical competence rather than by technical skills. A professional player enjoys the advantages of a personal coach who follows the match, takes notes and videos of the different situations during a match and discusses his findings with the player. The importance of this data has been known for a long time, so recording player's data on handwritten sheets is still in use by many professionals, as well as coaches or other skilled people.

By way of contrast, such levels of support are not typically available to a non-professional player. These handwritten notes are kept by the individual coach, but in an academy for younger players, this information needs to be shared with other individuals focused on the player's education, sponsorship, parents, and the academy itself.

During the last 10 years, more and more electronic devices have come onto the market allowing for us to improve the manual collection of data. Hand held devices such as pocket computers or laptops with commercially available software gives the possibility to trainers to enter data and to show match statistics as shown during TV coverage of tennis games, providing basic information such as break points won or unforced forehand errors. These statistics are useful for a professional but are not precise enough to help in the training process of an amateur sport player in his path to becoming professional. Therefore such electronic devices and software are only of limited usefulness for the non-professional player wanting to improve his game and become professional.

Information about the game is another area where professional sports and non-professional sports, and in particular tennis matches, differ enormously. In professional sports the spectators are informed by a large amount of information provided by the media with the ranking and results of the players updated by the staff of the tournament. In non-professional tennis, even during tournaments, the players have to take and display the scores by themselves, by mechanical or digital devices, usually during the change of sides after two games. Usually only the statistics of the final games won are recorded. For sponsors who do not continuously follow the match they are not informed about the actual score or details of the results of the player. Thus non-professional tennis is not very attractive to follow for supporters of the players, be it sponsors or spectators, as there is no control of and little monitoring of the matches. This situation is even worse if the matches of a tournament are held at different locations rather than in an academy or federation. In this case, even the tournament direction receives the match results after the match. There is no possibility even for professional trainers to follow the scores if they are outside the court, be it from there lounge or over the Internet.

For these and other reasons, improvements in the general area of sporting performance and player data management are desirable.

SUMMARY

The information disclosed herein relates generally to the fields of sports training and computer systems. In particular, the disclosure relates to a system and method for collecting, processing, and communicating data related to the development of athletes or other competitors.

In a first aspect, a method for assisting in player development is disclosed. The method includes receiving input data from a first user at a server. The method also includes storing the input data associated with a player development record in a player development database, the player development database storing a plurality of player development records, each player development record aggregating player data over time and each player development record including at least training data, competition data, and biographic data. The method also includes receiving a request to generate a player development profile for a particular player based on the player development record. The method also includes generating a player development profile by way of an automated player performance application, the player development profile being based at least in part on performance trends in the player development record and also including one or more recommendations or comparisons.

In a second aspect, a system for assisting in player development is disclosed. The system includes a server maintaining a database including a plurality of player development records, each player development record including at least training data, competition data, and biographic data. The system also includes an application hosted by the server, the application including a user interface and an automated player performance application, the automated player performance application being configured to generate a player development profile for display in the user interface, the player development profile being based at least in part on performance trends in the player development record and also including one or more recommendations or comparisons.

In a third aspect, a method for assisting in player development is disclosed. The method includes registering a player with a web based player development service. The method also includes tracking player development records using the web based player development service, thereby forming an aggregate record at the web based player development service, each player development record including at least training data, competition data, and biographic data. The method also includes requesting a player development profile for a particular player from the web based player development service, the player development profile being based at least in part on performance trends in the player development record. The method also includes viewing the player development profile that is generated by an automated player performance application of the web based service.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 23 illustrates an example player biographic information page user interface for a player development system, according to an example embodiment;

DETAILED DESCRIPTION

Figure 1:
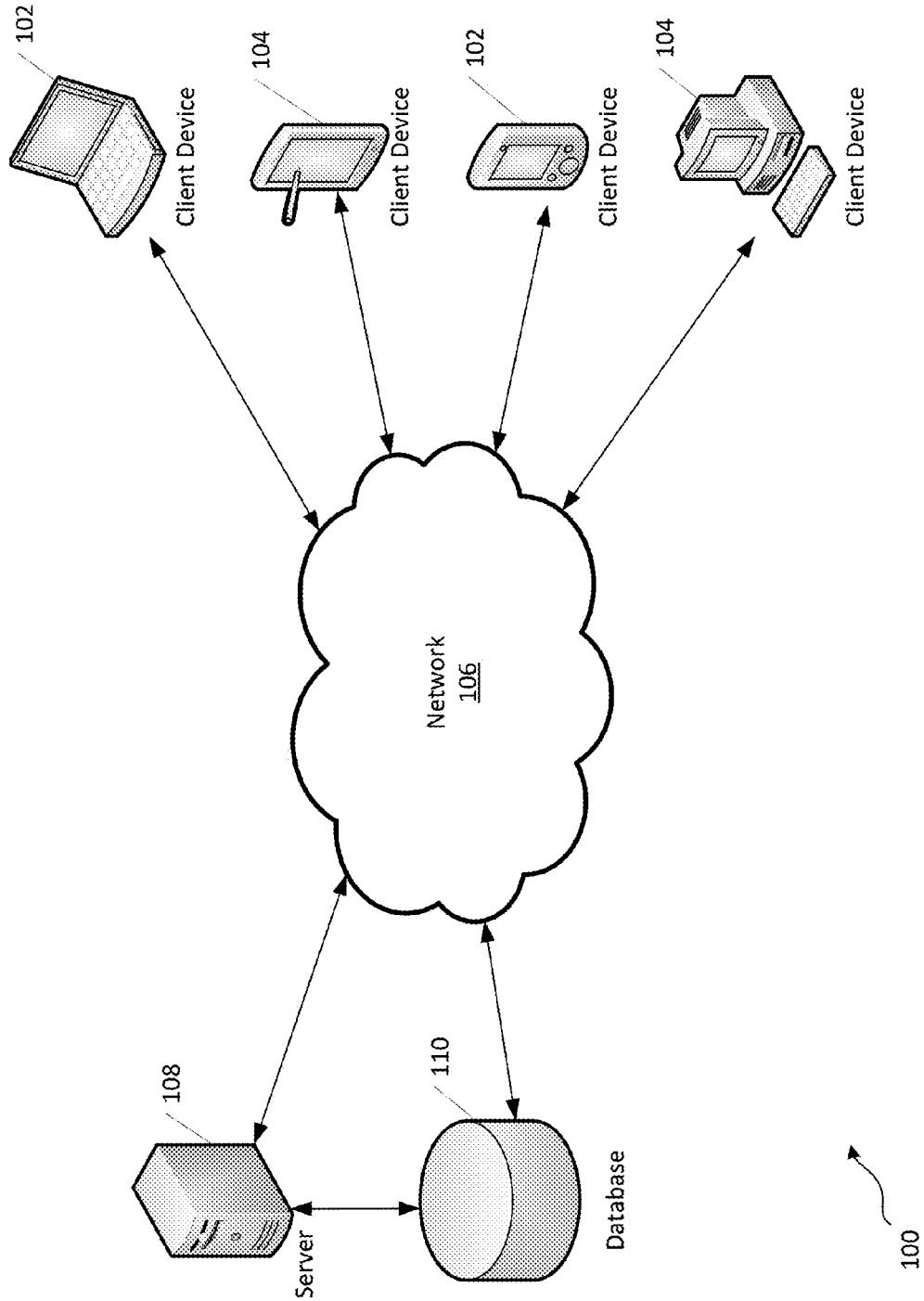
FIG. 1 illustrates an overall network in which users can interact with a player development system, according to an example embodiment.

Various embodiments of the present invention will be described in detail with reference to the drawings, wherein like reference numerals represent like parts and assemblies throughout the several views. Reference to various embodiments does not limit the scope of the disclosure.

In general, the present disclosure relates to the fields of sports training and computer systems. In particular, the system and method disclosed herein can be used for collecting, processing, and communicating data related to the development of athletes or other competitors. In example aspects, the present disclosure relates to a system that provides professional sports data to trainers of future professional sport players. The computer program facilitates the data needed by trainers to analyze the progression of players creating faster and better sport players. The information provided also facilitates the quality of the training of the coaches as well as providing improved data for sport sponsorships.

The methods and systems described in the present application have many advantages over existing systems. For example, the methods and systems described herein provide improved access to specific data regarding the results and improvement of future sport players to sport academies, sport federations and organizations including trainers, players and sponsors. Information on how a player has performed in a certain month, against different opponents, how the physical condition of the player has changed or how each trainer is developing the skills of a player in a certain month can be readily obtained by appropriate audiences.

There is also a desire to know how to strategically plan a match against an opponent by comparing past performance of specific detail; number of points won, where was the player mostly positioned, what points did he tend to lose or win, what conditions were most favorable for each player. This specific comparison of data is not achieved with summarized information of games, sets or a match won but requires a more detailed approach. It is in this general context that the methods and systems described below provide solutions for player management to those of skill in the art.

Referring now to FIG. 1, a generalized computing environment in which aspects of the present disclosure can be implemented is shown, according to one embodiment. FIG. 1 illustrates an overall player development system 100 in which users can interact. In the exemplary embodiment shown, the network 100 includes a plurality of client devices 102,104 which provide users a way to access the player development system 100. The client devices can be computing systems 102, or mobile devices 104. The computing system 102 or mobile device 104 can connect to the player development system 100 via a connection over a network 106, such as the Internet.

In the embodiment shown, a server 108 is also communicatively connected to the network 106. The server 108 generally manages a process by which player development data can be organized and analyzed. Additionally, in the depicted embodiment, a database 110 can be communicatively connected to the server 108. The database 110 can be configured to store a plurality of player information in player development records.

In general, the client devices 102, 104 can be operated by one or more different types of users. For example, a user can be, in different contexts, a player, a parent of the player, a trainer or coach, a sponsor, an academy or other institution affiliated with the player, a potential sponsor, or a recruiter. In some embodiments, the data accessible using the client devices 102, 104

Figure 2:
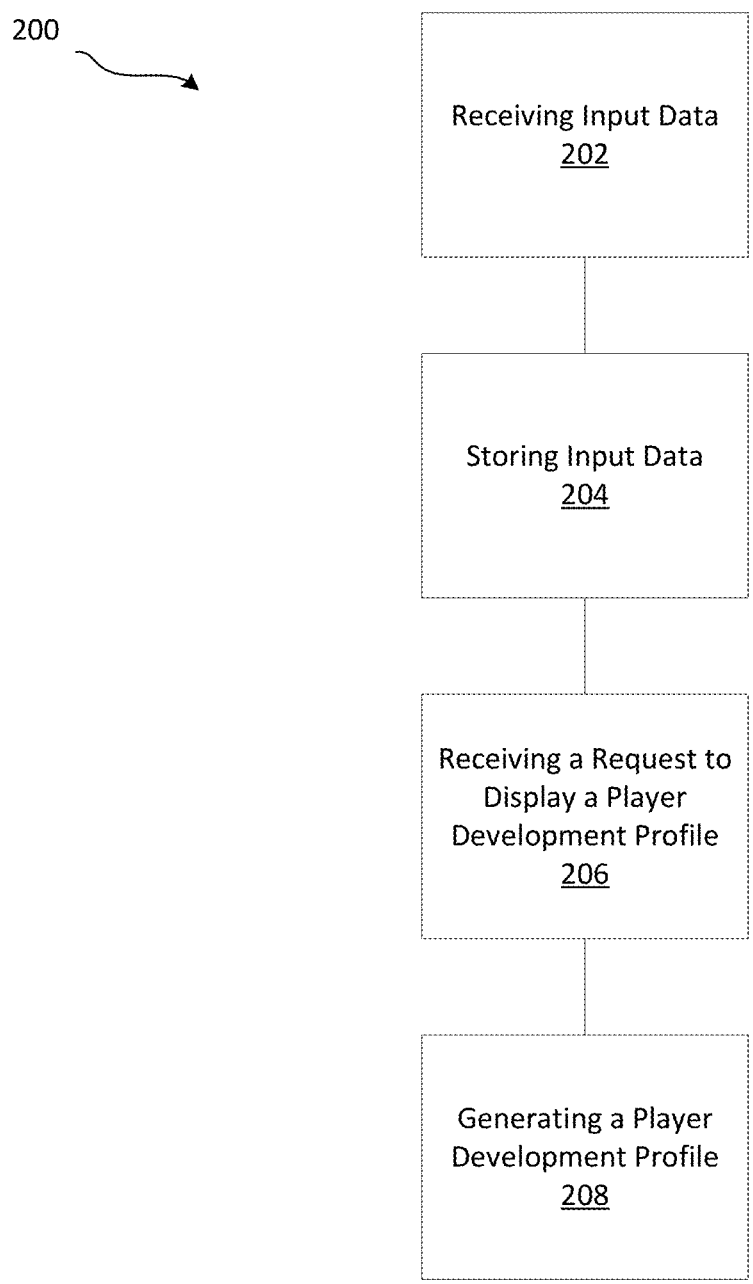
FIG. 2 illustrates an example method for which the player development system 100 can interact with the user, according to an example embodiment.

Referring now to FIG. 2, a method 200 by which the player development system 100 can interact with the user is shown. According to one embodiment, the player development system 100 first receives input data (at operation 202). In some embodiments, data is manually input into the system 100 by a user, or it may be alternatively uploaded from another database (e.g. ESPN, Sky Sports, FIFA, NBA, NFL ITF or other sports network). Data can be input at the client devices 104, 106. In the depicted embodiment, the player development system 100 then stores (at operation 204) the input data. In some embodiments, the input data may be stored in a database. Further, the player development system 100 then receives a request from a user to generate a player development profile (at operation 206). In some embodiments, a server can receive this request to generate a player development profile, for example via a web application or mobile application resident on or executing on a client device 102, 104.

The player development system 100 then generates a player development profile (operation 208) based on such a request. In some embodiments, a server can access a database that includes a plurality of player development records in order to generate a custom player development profile, the profile including some or all of the information stored in the player development record.

Based on generation of player development profiles for various audiences, at least some of the advantages of the systems and methods described herein can be recognized. For example, in some cases, the player development record can generate recommendation or trend information associated with a particular player, for example to allow the player, trainer, or academy to assess the player's historical performance and performance trends as associated with training techniques and/or habits, to allow a sponsor or potential sponsor to view the player's performance, personality, and likes/dislikes, or to allow a parent to monitor overall progress associated with the player.

Figure 3:
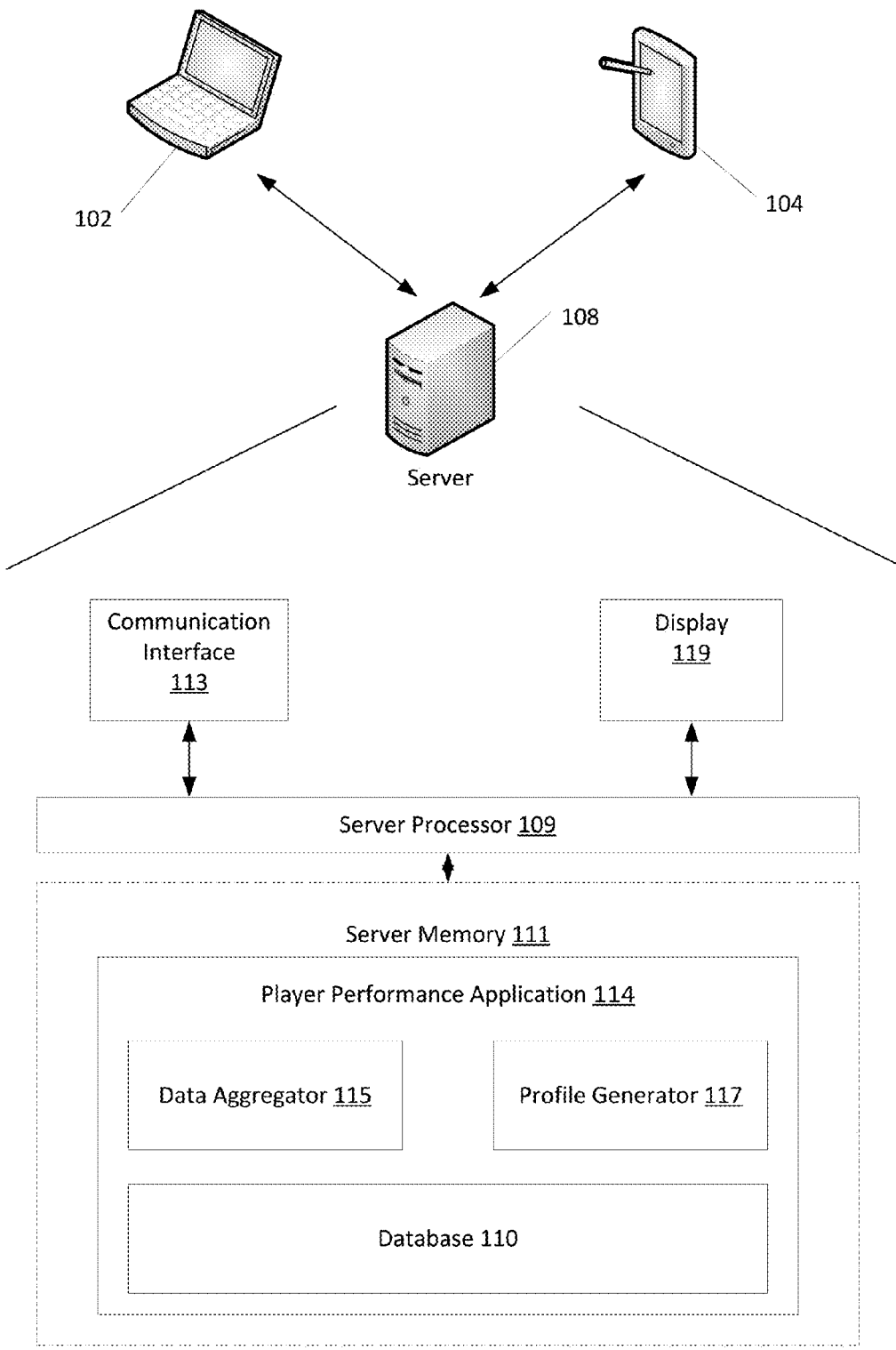
FIG. 3 illustrates an example schema illustrating data managed by the server, according to an example embodiment.

Referring now to FIG. 3, an implementation of server 108 is illustrated, according to an example embodiment of the present disclosure. The server 108, in the embodiment shown, stores information associated with one or more players. In various embodiments, the server 108 can be implemented as a computing system or a plurality of computing systems, either managed by a particular entity or within a distributed, third-party managed framework, such as a cloud-computing arrangement.

As seen in FIG. 3, the server 108 includes a web server component 112 and a player performance application 114. In the embodiment shown, the web server component 112 is configured to generate, manage, and provide a plurality of web-based user interfaces access to the player development system 100. Example methods enabled by the player development system 100 are described in connection with FIGS. 14-21, and example user interfaces are discussed in further detail below in connection with FIGS. 22-26. In general, the player development system 100 is configured to track player development information, as well as to generate, either automatically or as guided by a particular user, analyses of the player data, such as to improved player performance, to assess relative player strengths and weaknesses, thereby allowing users, including the player, to review that player's athletic profile, to assess his/her progress, success outlook, sponsorship possibilities, travel schedule, and myriad other player management aspects as discussed more fully below.

Additionally, a player performance application 114 can also be included in the server 108. In some embodiments, the player performance application 114 will access player development records stored in a database 110 and generate a player performance profile from the player performance record. The player performance profile can include, for example, some or all of the information stored in the player development record. The player performance application 114 can, when executing, analyze different types of data stored within the player performance record and make certain comparisons or recommendations based on such data. Example methods of generating comparisons and recommendations are discussed further in detail below in connection with FIGS. 14-21.

In the embodiment shown, the server 108 includes a processor 109 and a memory 111. The processor 109 can be any of a variety of types of programmable circuits capable of executing computer-readable instructions to perform various tasks, such as mathematical and communication tasks.

The memory 111 can include any of a variety of memory devices, such as using various types of computer-readable or computer storage media. For example, in some embodiments, the memory 111 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components.

In the embodiment shown, the memory 111 stores a player performance application 114. The player performance application 114 performs analysis of dynamic data, such as is received in data streams (e.g., from a plurality of client devices 102, 104). In the embodiment shown, the player performance application 114 includes a data aggregator 115, a player profile generator 117, a user interface definition component 119, The data aggregator 115 receives dynamic player performance data, for example from a data stream, and performs a principal component analysis on that data, such as recognizing the identity of the player. For example, the data aggregator 115 can recognize the identity of the player performance data and place that data in the corresponding player performance record stored in the database 110.

The database 110 stores a plurality of player development records that can be converted into one or more player profiles. The player development records include all data associated with a user that can be aggregated from the player as well as any user associated with the player, such as an academy, a trainer, a parent, a psychologist, or other users. For example, the player development records can include, in non-limiting and non-exhaustive examples:

Personal Data (name, birthday, residence, nationality, photographs, medical information, etc.);

Competitive data (best results, type of play, current results, tournaments entered, memberships, etc.);

Physiological data (height, weight, arm and leg measurements, speed, etc.)

Training data (coach, diet, training program, technical training received and technical specialties, speed, power, musculature trends, training exercises performed, frequency of exercises, particular adeptness to a skill such as a shot, etc.);

Nutrition data (diet name, calories allowed, meal preparations, allergies, historical nutrition information);

Sponsor information (name of sponsors, type of sponsorship, sponsorship offers, etc.);

Injury information (types of current and historical injuries); Comparative data (head-to-head or comparative skill-based data comparing the player to other players); and Motivational data (data relating to favorite songs, videos for pre-match motivation, long term goal-based motivation, mental exercises used by the player under psychologist supervision, and general overall mental health.)

The player profile generator 117 presents to a user a configurable arrangement with which the player performance application can be configured to receive input streams and arrange analyses of those input streams, thereby allowing a user to define various analyses to be performed on the input data streams. This can include, for example, a configurable analysis of multiple data streams to produce a variety of different player performance profiles.

The server 108 can also include a communication interface 113 configured to receive data streams from client devices 102, 104, and transmit notifications as generated by the player performance application 114 to remote systems, such as client systems 102, 104 of FIG. The server 108 can also optionally include a display 119 that is capable of presenting a user interface associated with the player performance application 114. In various embodiments, the server 108 can include additional components, such as peripheral I/O devices, for example to allow a user to interact with the user interfaces generated by the player performance application 114.

Figure 4:
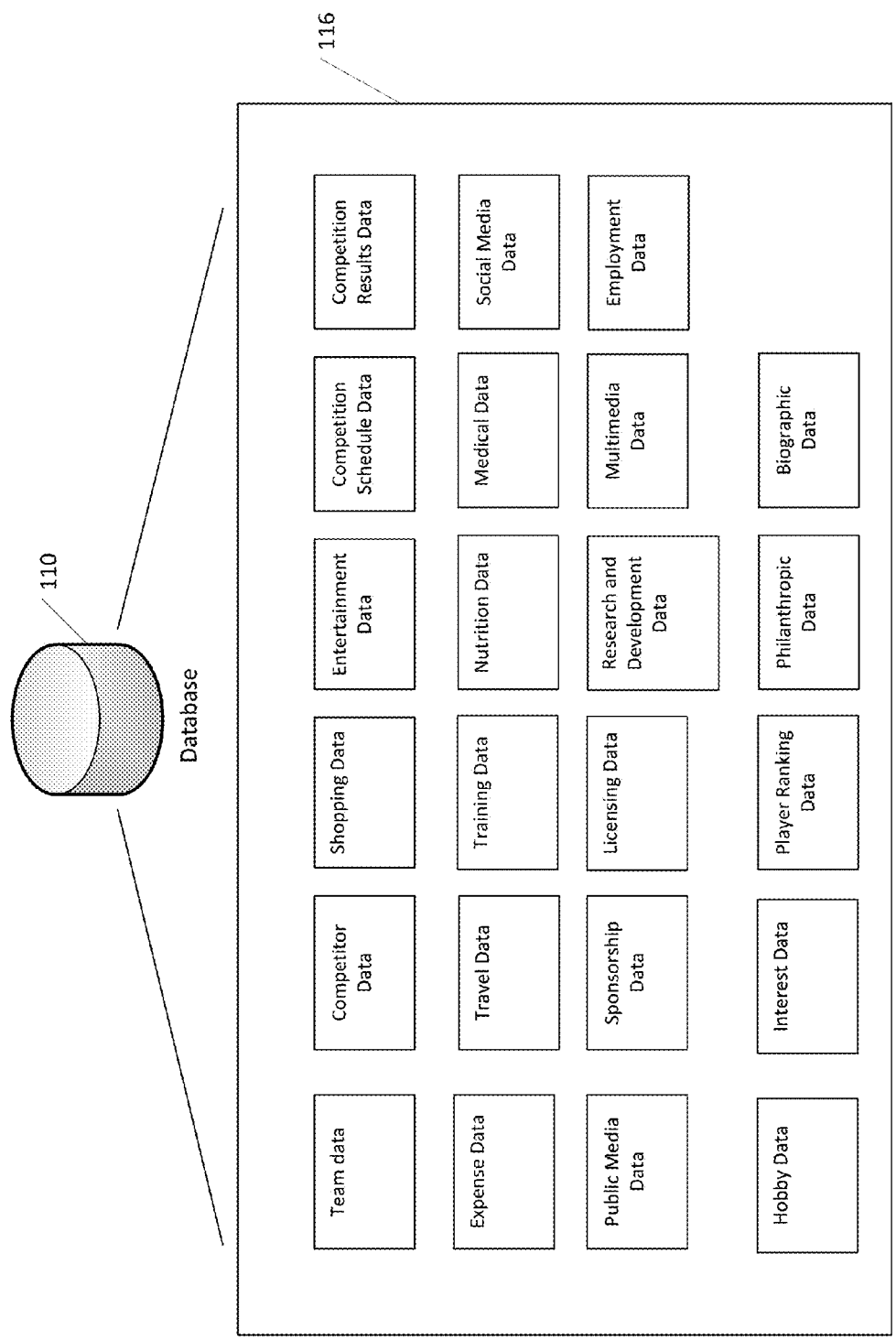
FIG. 4 illustrates an example schema illustrating data types stored by the database, according to an example embodiment.

FIG. 4 shows the database 110 according to one embodiment of the present disclosure. The depicted database 110 can include a plurality of player development records 116 for a plurality of different players. As shown, an example player performance record 116 includes a plurality of different types of data. The player development record 116 can include, but is not limited to, one or more data categories, the data categories selected from the group consisting of education data, team data, competitor data, shopping data, entertainment data, competition schedule data, competition results data, expense data, travel data, training data, nutrition data, medical data, social media data, public media data, sponsorship data, licensing data, research and development data, multimedia data, employment data, hobby data, interest data, player ranking data, and philanthropic data.

In some embodiments, different players may elect to populate different data fields within the player profile. For example, a player for whom sponsorships and travel are particularly important may opt to populate portions of the database relating to their competition results, but also public media data and sponsorship data. A younger player or a player less focused on sponsorships and/or media issues may opt to only populate (or have populated) portions of the player records, for example relating to training, nutrition, competition results, or other similar aspects.

Figure 5:
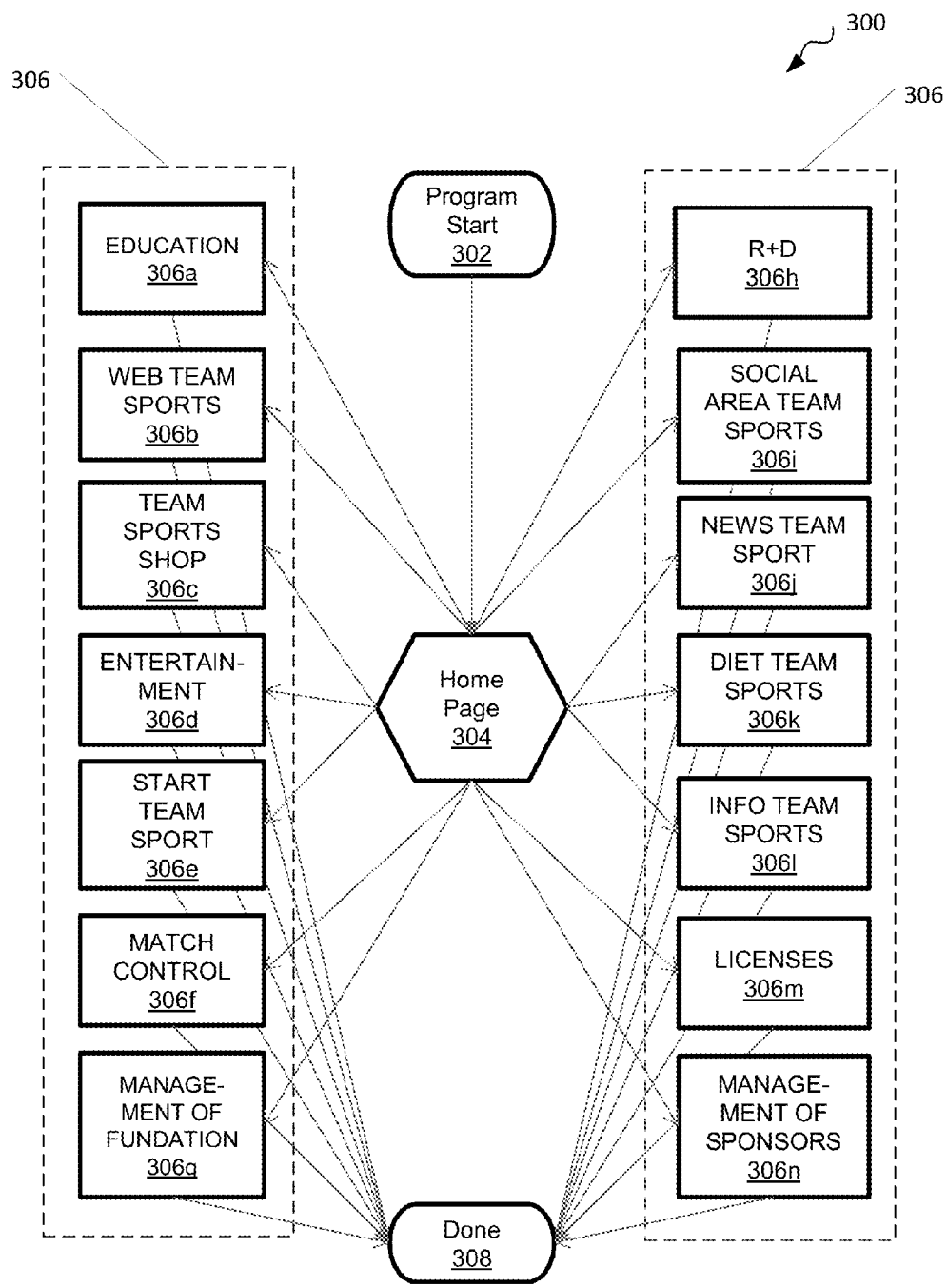
FIG. 5 illustrates a relationship diagram showing components of a player development system, according to an example embodiment.

FIG. 5 is a relationship diagram showing components of a player development system 300, according to one embodiment of the invention. As described herein, the player development system 300 is implemented within the environment illustrated in FIG. 1, for example using the computing systems as noted above in connection with FIGS. 1 and 3.

In the example shown, the player development system includes an initialization user interface 302 that is coupled to a general home page user interface 304. In some embodiments, the general home page user interface 304 allows access to all of the functional components 306a-m (referred to generally as functional components 306). In other embodiments, access to certain functional components 306 may be limited from the general home page user interface 304, for example based on an identity of a particular user of a system and the intended user profile associated with the data requested. Each of the functional components 306 are coupled to the termination component 308. The termination component 308 allows the user to exit the player development system 300. Although discussed in further detail below, the functional components can include, for example, an education component 306*a*, a team sports component 306*b*, a team sports shop component 306*c*, an entertainment team sports component 306*d*, a team sport start component 306*e*, a match control component 306*f*, a funding management component 306*g* an R&D component 306*h*, a social component 306*i*, a team sports news component 306*j*, a team sports diet component 306*k*, a team sports information component 306*l*, a licenses component 306*m*, and a sponsor management component 306*n*. Other components could be included as well. Example operation of certain ones of these components are provided in further detail below; generally each component can be configured to access a player profile record and generate one or more recommendations from that record, for example by drawing correlations between As illustrated, the system 300 allows for both incorporation of functional components 306 associated with a broad range of functions, but extensibility of the system to new and/or different functions depending upon the needs of a player audience or other users, for example by adding new functional components to the system. Such an integrated approach at least reduces, if not eliminates, the need for multiple systems.

Variations to the configuration illustrated in FIG. 5 are possible. For instance, in embodiments of the invention, two or more functional components 306 may be coupled to each other. In addition, the specific collection of functions included in the functional components 306 could be varied according to design choice.

Figure 6:
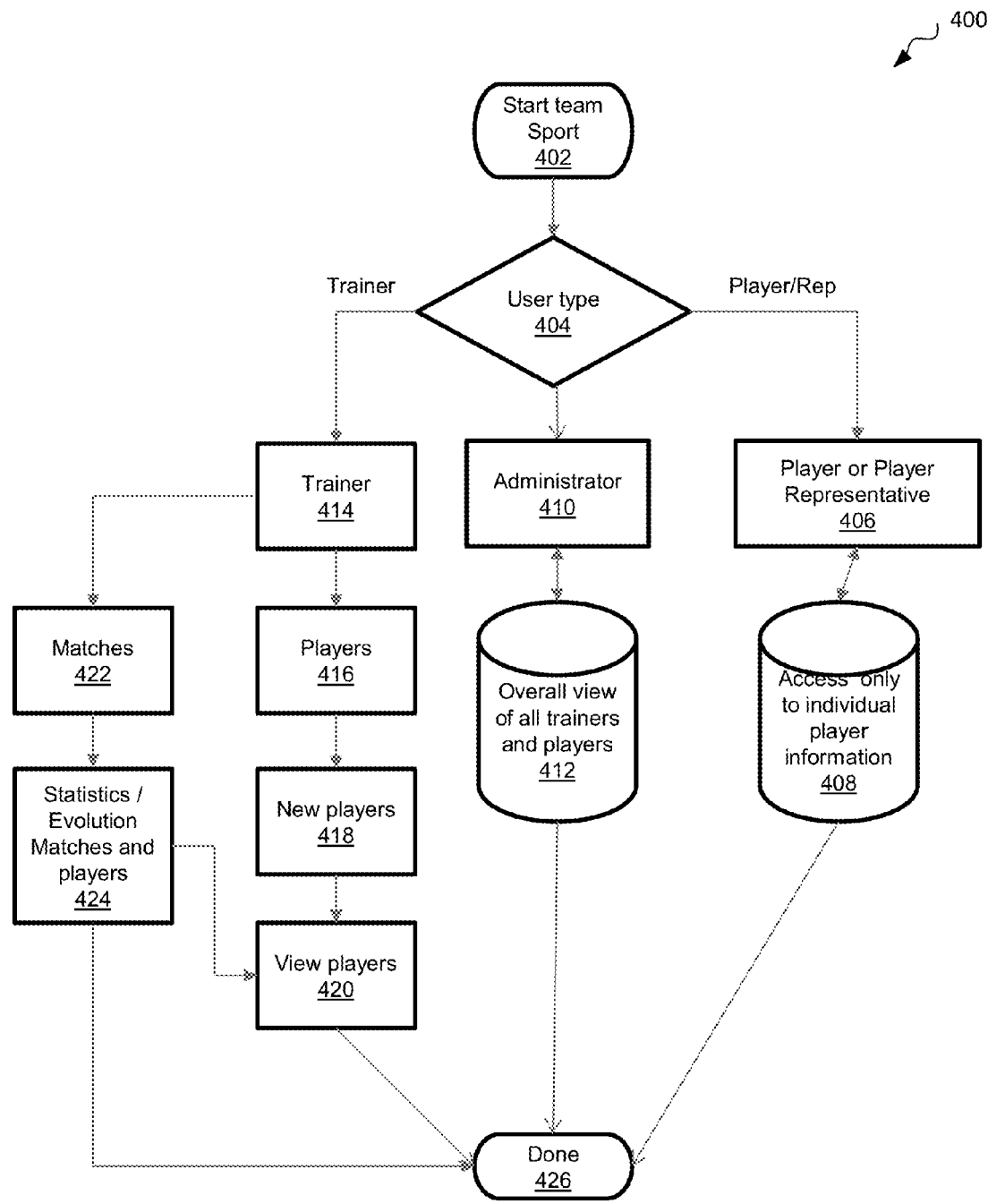
FIG. 6 illustrates a flowchart diagram of user-dependent access control in a player development system, according to an example embodiment.

FIG. 6 depicts a method of operating a player development system 400 according to one embodiment of the present disclosure. The method depicts a player development system 400 that allows user-dependent access. The player development system 400 allows for controlled access to certain information based on the identity of the user. Specifically, it allows for access to tailored player development profiles that include only specific information from a player development record, based on the identity of the user.

In the embodiment shown, after method 400 is initialized (step 402), the player development system 400 can determine whether the user is a trainer, administrator, or player/rep (i.e., a player or a player representative) (step 404). In some embodiments, the user type determination is based on or includes a login operation, and the determination can occur based on user credentials provided by a user. The login operation includes, in some embodiments, receiving a user ID from the user from a team, academy, or like entity, or a user ID created by the user. The login operation can be accomplished, for example, via a browser window of a client device 102, 104, which can access a user interface generated by a server, such as user interface 112 of FIG. 3. Preferably, in some embodiments the authentication is configured to handle both new and returning users, for instance via a user registration process. In some embodiments, each player profile can be associated with certain permissions that allow the user certain access to the player development system 400. In some embodiments, the player development system 400 can have three different types of groups of permissions, or permission sets. One permission set can be a player/representative set. Another permission set can be an administrator permission set, and a third permission set can be a trainer permission set.

As used herein, a trainer (e.g. "sports specialist") could be a sports trainer (i.e., a person certified in the prevention and treatment of physical injuries) or a coach (i.e., a person who directs players and teams with respect to physical and skills development and/or during competition). An administrator could be, for instance, a system administrator, a team manager, a team owner or team investor. A player is generally an athlete, either an individual competitor or a team member, although the player development system 400 described herein could also be adapted for the development of non-athletic competitors (e.g., chess players). A player representative could be, for example, a parent, mentor, agent, or other player representative.

In the case of a player, the method 400 includes presenting player options (step 406), which include access to that player's own data in step 408. In some embodiments, the method includes permitting the player to add and view data, but not edit the data. In other embodiments, the method only permits a player representative to view player data (step 408).

Where the user is determined to be an administrator, the method includes presenting administrator options (step 410), which can include access to all trainer and player data (step 412). In some embodiments, an administrator can view and edit all data in the player development system 400. Also in some embodiments, the player data that is viewed by an administrator includes the option of viewing data in summary format.

Where the user is a trainer, the method 400 includes presenting options for training management (step 414), for example including inputting player data (step 416), creating new player development records (step 418), and viewing player data (from players, trainers, and other sources) (step 420). A trainer may also be allowed to input data associated with matches (or other competitions) (step 422) and view related statistics (step 424) before the method terminates (step 426).

In embodiments of the present disclosure, the player development system 400 includes one or more algorithms for processing data (for example to prepare the statistics available in step 424) and can also report data viewed by trainers, administrators, or players in bar charts or other graphic formats. Examples of such charts are provided below in connection with the user interfaces of FIGS. 22-26.

FIGS. 7-11 provide a flow diagram for a method 500 of access to data in a player development system, according to an example embodiment of the present disclosure. The method 500 can be performed by a user, for example a player, using the systems described herein, for example by access via a web application or mobile application from a user device, such as client devices 102, 104 of FIG. 1.

In the embodiment shown, a user, such as a player, may opt to view player data (step 502). That user may then optionally elect to view a player development profile. The information included in the player profile can be stored in the corresponding player development record. For example in the context of a tennis player, the player profile information can include vital statistics, as well as training records, rankings, or expense information. Of course, although the example data in the depicted embodiment is directed to use by a tennis player, this is meant to be illustrative and not meant to limit the scope of the present disclosure. Rather, data and recommendation modules included in such a system can be extended or tailored to other aspiring professional athletes from other sports.

Depending on permissions given to view certain data types, a user's ability to see certain types of information may be different than another user (i.e. a player vs. a trainer). In the depicted embodiment, the method 500 can allow the user to enter or view various types of data associated with a player development profile; for example, a user may enter or view event data (step 504), or may opt to edit or view expense data (step 506). The player may opt to view or edit player evolution data (step 508), which can correspond to trends in player performance. The user may also enter or view match comparisons (step 510) to view competition performance, as well as training data (step 512) to view out-of-competition performance. Accordingly, a more comprehensive view of player performance than simply tracking competitive performance can be provided. Additionally, the user may opt to view or edit a professional profile (step 513) or enter an online shop (step 515). The user may utilize one or more provided travel tools (step 517) for coordinating travel to competitions and other scheduling demands, or opt to view sport scholarship information (step 519). The user may further utilize the system to manage competition entries (step 521), or access to federations and associations (step 523). The user may enter hobbies and events of interest associated with a player (step 525), music/film/social trends/religion (step 527), information regarding public media (press and television) (step 529), either for public viewing or for private monitoring. The user may also access research & development (R&D) regarding training methods (step 514) for example to view training methods that avoid injury, shorten recovery time, and improve player development, or view media reports (step 516) including live match streaming and video analysis, education data (step 518) including schools attended, activities, exams, and scholastic and behavioral evaluation, charity work (step 520) such as donations or support of causes for those with disabilities or those who are underfunded/lack resources, employment data (step 522) relating to coaches, and sponsorship data (step 524). Track A illustrates that a user may navigate between the foregoing process steps. In alternative embodiments, one or more of the foregoing options could be deleted and one or more options could be added, according to application requirements. In some embodiments, the player development profile may include a single or plurality of recommendations or comparisons generated by the player development systems based off of data in the player development record. Such recommendations and comparisons will be discussed in more detail below in FIGS. 14-21.

In addition to the input methods discussed above, it is noted that different types of users can collaborate on such inputs, thereby ensuring a complete record for a particular player. For example, a trainer may enter training data when the trainer interacts with the system, but the player themselves may also enter training data associated with the same training session, thereby providing further information regarding reasons for particular practice performance (e.g., due to lack of sleep, diet, etc.). Similarly, a player may have the option to enter or view expense information, but a parent may also have rights to enter or access such information (while a trainer or potential sponsor may not have analogous access rights to such data). Other analogous user rights issues are provided herein to ensure that the system represents a complete record of the player, while ensuring that player privacy is preserved.

Figure 7:
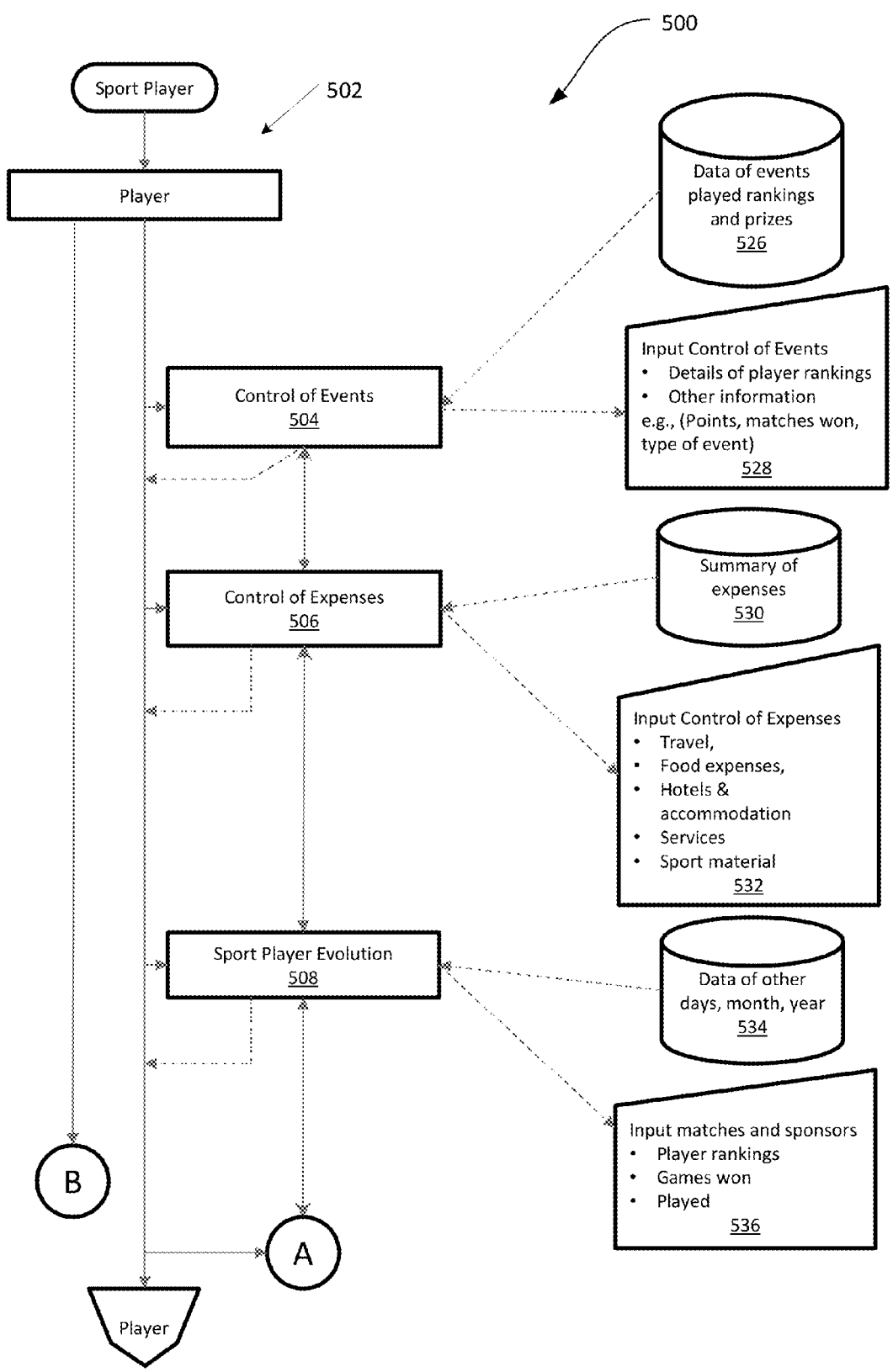
FIGS. 7-11 illustrate a flowchart diagram depicting access to player data in a player development system, according to an example embodiment.

As shown in FIG. 7, receipt of event data at step 504 (typically related to current events) could include competition, ranking or other data received from third party sources (step 526), and can also include manual entry of such data into a player management profile (step 528). In some embodiments, viewing of user information can also include viewing of a recommendation or comparison. Likewise, expense controls (as viewed in step 506) could include a system-generated summary of expenses (step 530) and can also include inputting transportation, food, hotel, or other expenses (step 532). In some embodiments, the summary of expenses may include a recommendation or comparison based on a budget set by the user. In other embodiments, the summary of expenses may include a recommendation or comparison based on potential future travel expenses and a budget set by the user or another user (e.g. a trainer or administrator). Similarly, viewing a player evolution (e.g., in step 508) could include viewing historical competition results (step 534) or inputting historical competition results (step 536). In some embodiments, viewing historical competition results may include a recommendation or comparison based on past performance of the player. In other embodiments, the recommendation or comparison may be further based on competitor data.

Figure 8:
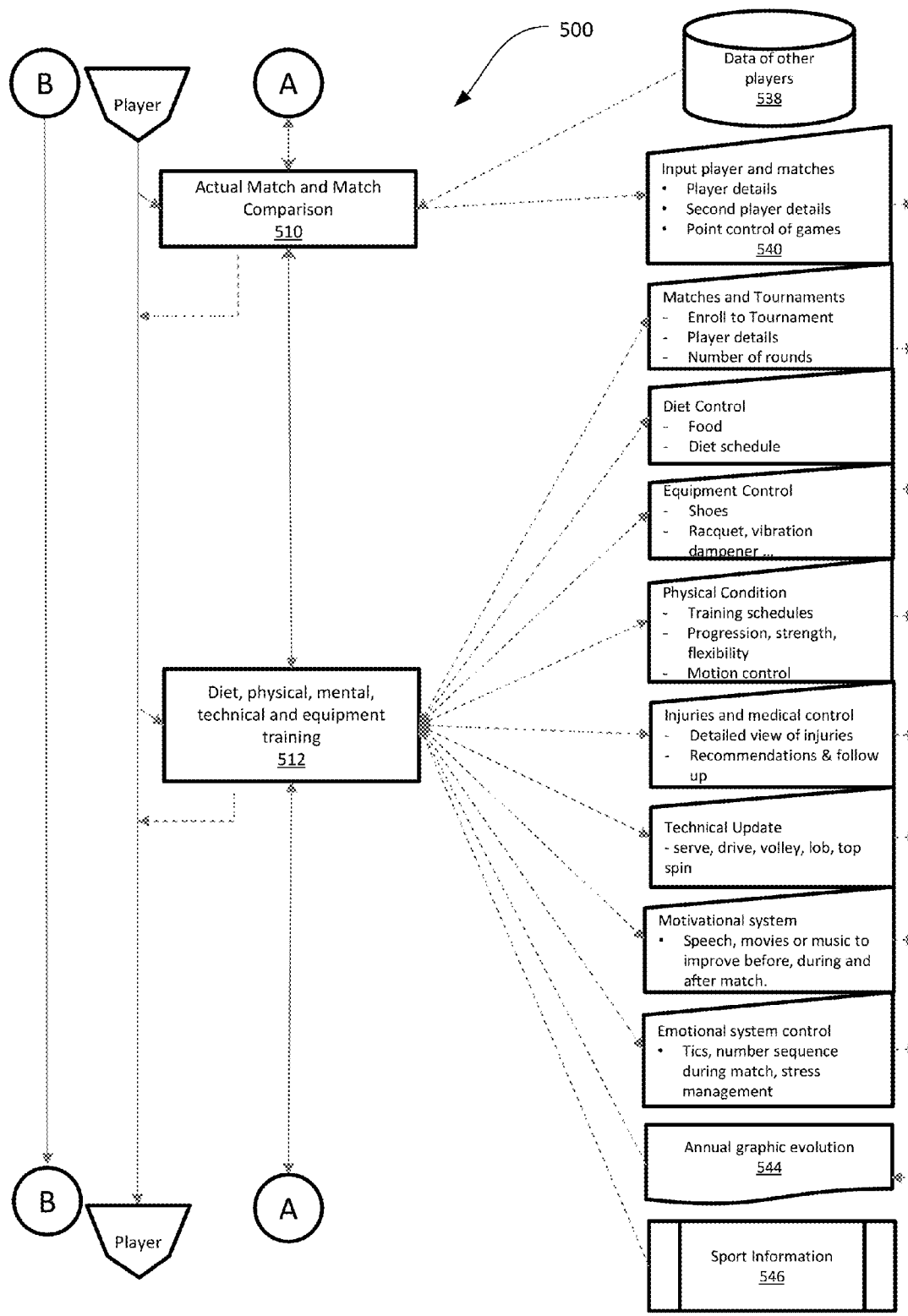

With reference to FIG. 8, viewing or editing of match comparisons (step 510) can relate to comparisons between the selected player and a competitor. Such comparisons may inform player tactics during future competitions. Accordingly, a user may view or import data regarding one or more other players (competitors) (step 538), or input perceived strengths and weaknesses of the selected player and/or a competitor (step 540).

The training data viewing and editing (diet, physical, mental, technical, and equipment) (step 512) can include a variety of detail entered by a user such as a player, coach, or trainer (step 542). Such data can include, but not be limited to, future match and tournament registration and information. Additionally, the training data may include a nutritional plan; specifically, a dietary schedule and types of food to be eaten and when. In some embodiments, nutritional data may be correlated with physical training data to optimize how nutritional intake may influence the physical and mental being of the player.

Further, equipment information regarding the effectiveness of past types of equipment for a specific player, including recommendations for improved equipment that might be available can be included. Further, physical conditioning data can be included in the training data. The physical conditioning data can include past data and future data, including future training schedules. Additionally, the physical conditioning data can include trend analysis along with recommendations for future training exercises based on certain benchmark data, past performances and training goals. In other embodiments, the physical training data can include training videos. In some embodiments, calculations on based physical training schedule will show how the training schedule may affect the player (more resistance, more strength). Still in other embodiments, the physical training data may include evaluations from other players on certain training programs and certain training equipment.

The training data can also include technical updates on the player, including progression of measurable skills (e.g. serving speed etc.). Further, the training data can also include data pertaining to the motivation of the player. Such motivation data can include player preferred motivational speeches, movies, music. This data can also be controlled by the trainer or administrator. For example, a trainer may share a motivational speech with a team prior to an important match. The training data can also include emotional system control data. This data can include information regarding certain tics of both the player and his/her competitors. Additionally, this data can also include plans to manage both in- and out-of-game stress.

To quickly and easily appreciate changes in any such training data, a user may receive a graphical representation of one or more training parameters over time (step 544). Sport-specific information related to the sport profile, for example information related to the game of tennis, golf, basketball or another sport, is available to a user to be viewed and/or edited (step 546).

Figure 9:
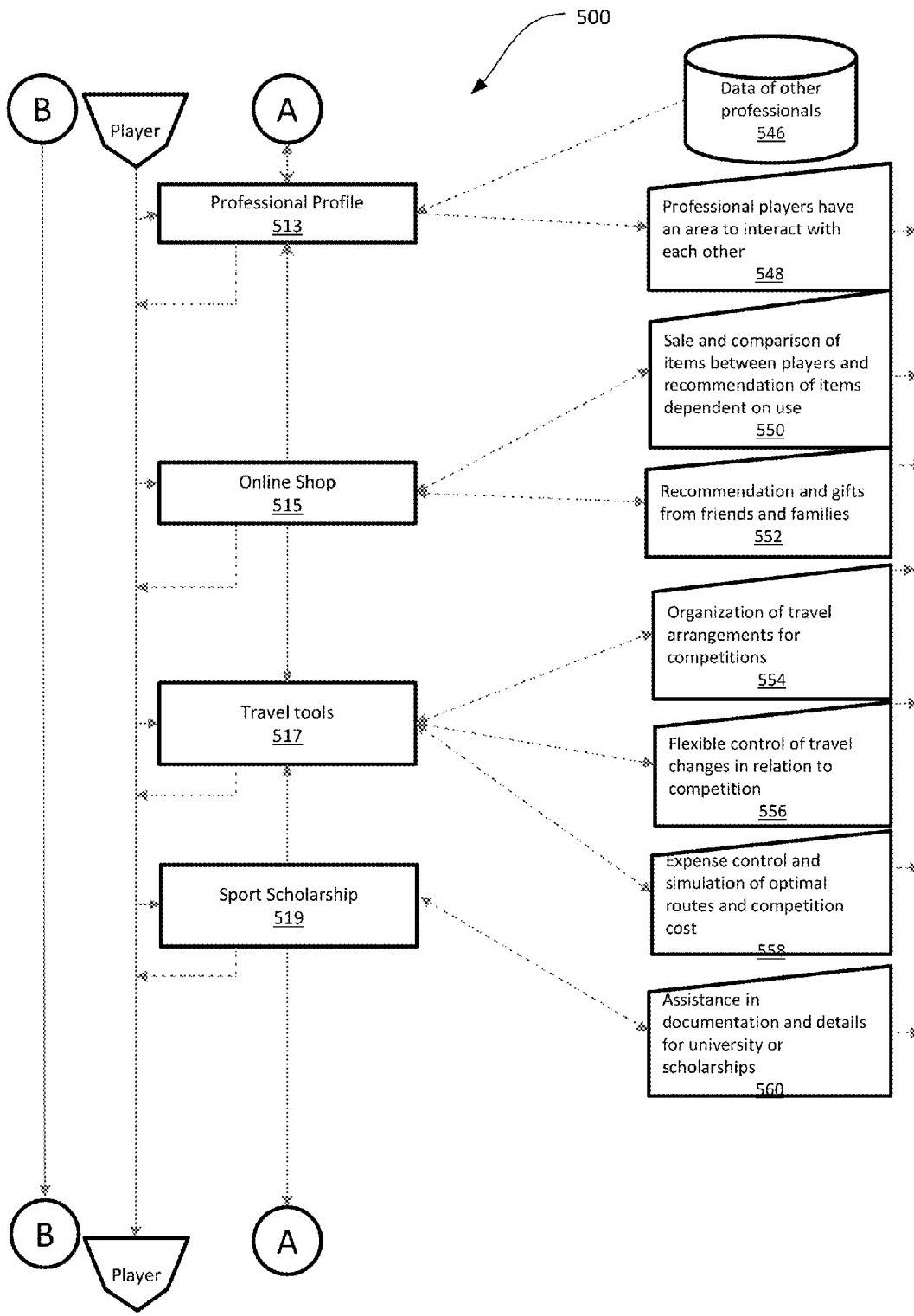

Referring now to FIG. 9, a user opting to view or edit a professional profile (step 513) can access data of other professionals or competitors (step 546). Such data can include past performance data, trends, perceived strengths and weakness, coaching details or other like data that may be pertinent to competition. Additionally, as players develop through the player development system described herein, a complete profile is being built, so a user can track the development and improvement of a player. For example, a player's professional profile could document development data from the time that player started in the particular sport (i.e. at a young age) all the way up to when the player won their last major championship. This allows for the capture of the development data at an early stage so that such data may be able to be utilized by other amateur players in their own development. Additionally, correlations of certain successful training and development measures can also be made based on the success of the player. Additionally, the other professional data may include data from a top-tier athlete, whom the player is striving to be like (step 546). Also, the player, in some embodiments, may interact with other players, trainers or other users via a messaging system or like communication system (step 548). In some embodiments, the professional profile (step 513) can also include success and failure stories from other players so that other players may learn from others' success and failures. In some embodiments, the player may choose to share his profile on a one time basis. This is advantageous as the player can temporarily share their information with a coach who just accompanied them to one tournament.

A user opting to access an online shop (step 515) can access the sale of a variety of different equipment, such as equipment associated with a particular sport. In some embodiments, the equipment may be sold by users or by external merchants. In some embodiments, sales comparison data can be displayed (step 550), for example to compare which users are using certain equipment and which items are recommended for the player based on a variety of different types of data. For example, a certain type of shoes may be recommended based on the fact that a player plays more tennis matches on a certain type of surface (e.g., clay, hard court, grass, etc.) and what equipment has been shown, by other players, to hold up and perform well. In some embodiments, users of the system who correspond to sellers of goods or manufacturers can receive information about what certain users are buying and looking to buy. For example, if users aged 12-14 prefer a blue shoe in a certain size, it allows for a manufacturer to make that type of shoe at that certain sizing, thereby reducing manufacturing cost and increasing the likelihood that the manufacturer may experience higher sales thanks to the data correlation. In alternative scenarios, the manufacturer may not otherwise manufacture such goods, particularly where a market for a product is relatively small (e.g., clay court tennis shoes). Of course, although the example is directed to use by a tennis player, this is meant to be illustrative and not meant to limit the scope of the present disclosure. Additionally, families and friends can access the online shop in some embodiments, so that they may purchase items for the player (step 522).

In other embodiments, the online shop (step 515) may only display items for sale that would be within the player's size range based on information stored else ware in the player development record.

Access to travel tools (e.g., at step 517) can help the player organize a travel plan. The system can present to the user simulations of certain travel plans based on both future potential travel and past travel (step 554). The user may choose between a variety of different travel route plans and services, thereby allowing for flexibility in timing of arrival and return (step 556). Similarly, the user may choose between a variety of different travel options that fit a variety of different budgets (step 558). In some embodiments, the travel tools will allow for the sharing of travel plans between different users to facilitate more cost effective travel. In some embodiments, the travel tools (the e.g., at step 517) can include evaluations of different facilities by players for the benefit of other players. Players can, for example, evaluate conditions of courts, toilets, and showers at certain athletic facilities, hotels, and even local food at a destination. In still other embodiments, the travel tools may include a payment platform so that a trainer can pay for the trips of all players assigned to a tour, or likewise charge a percentage to each player for his services as trainer. In still other embodiments, the travel tools can include a player locator function. RFID (radio frequency identification) of the player's location can be used to report a player's location and tournament they are playing in. The RFID can also send information to the system to be displayed to the legal guardian/parent and trainer. Likewise if a player has attended a tournament, the travel tools can help confirm the player has played in that tournament and confirm the registration. The RFID information may also be used to locate the player in emergency.

When viewing or editing school scholarship information (e.g., at step 519), data pertinent to college recruiters can be compiled. This can be especially helpful for international players looking to travel elsewhere on a college scholarship, as it provides a fast and efficient tool to compile data that is already in the player development system discussed herein, and can repackage and analyze it for recruiters. For example, documentation of certain performances, overcoming certain injuries, videos of actual performance, etc. can all be shown (step 560).

Figure 10:
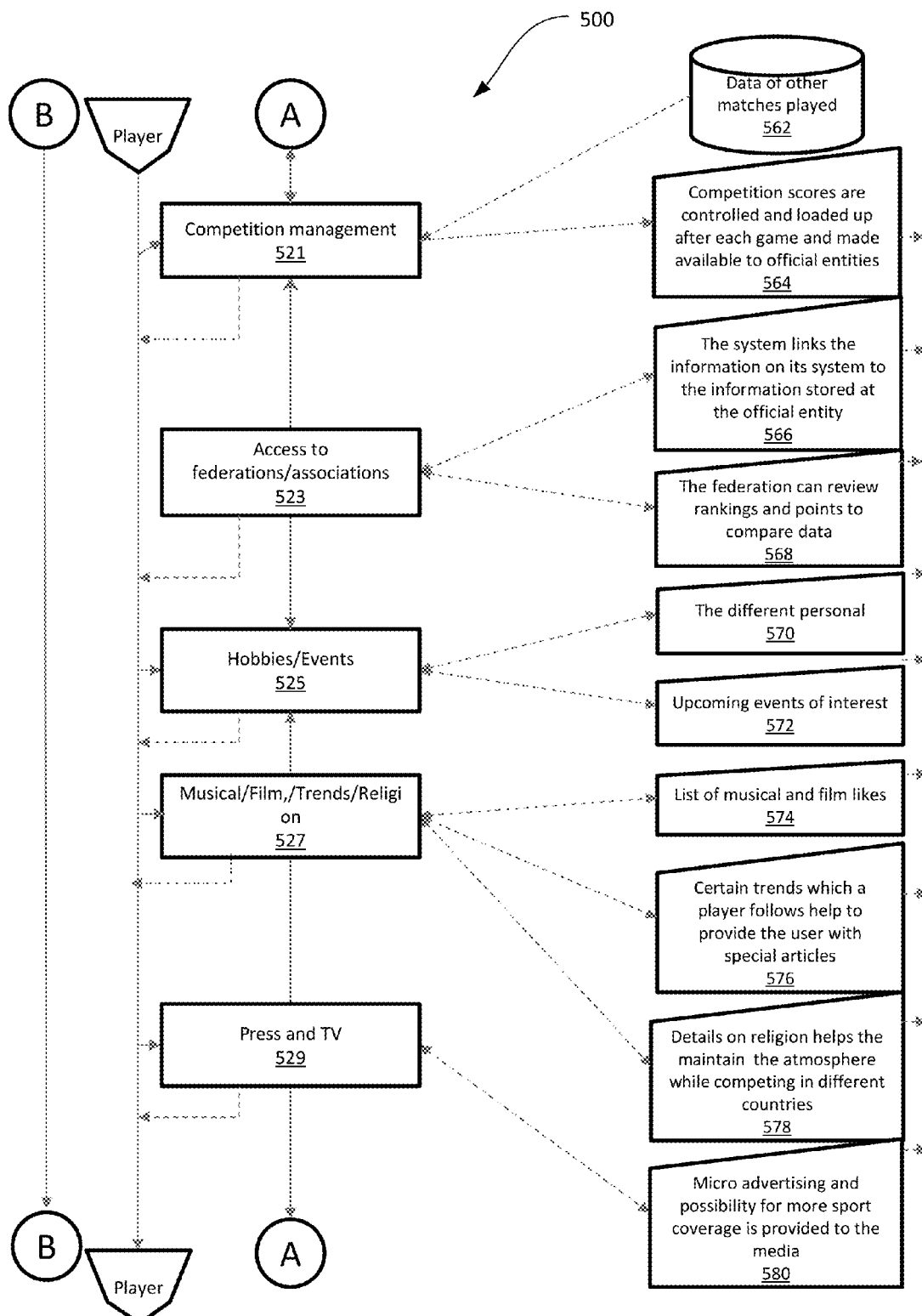

Referring now to FIG. 10, a user accessing a competition management features of the system (step 521) can view and/or edit enrollments or applications for tournaments and competitions, and allow the user to view past tournament data (step 562). In some embodiments, the player development system can control the number or frequency of tournaments the player can enroll in based on certain country or federation rules. In some embodiments, GPS and RFID technology can be utilized here to track which tournaments and competitions players have participated in (step 564). In other embodiments, competition representatives may upload competition data to the player development system (step 564).

A user accessing or viewing federations/associations (e.g., at step 523) can compare data being used by the player development system to the data stored by the federations to ensure accuracy of the data within the player development system (step 566). In other embodiments, federations may also review data (step 568) within the player development system. In still other embodiments, the access to the federations/associations can include access to a payment system so that users may pay dues to the federations.

When viewing and/or editing hobbies and events (e.g., at step 525), the user can see the hobbies and interests of a group of players (step 570) so that certain events can be organized based on certain interests. Additionally, in some embodiments, the user can view a list or calendar of events to the user to give the user freedom to choose which events he/she would like to attend (step 572). In other embodiments, the player development system can be configured to recognize the hobbies and interests of the player and suggest events that are tailored to those interests so as to provide a more focused list of events for the player that he/she would likely enjoy.

Similar to the hobbies and interest processes described above, the music/film/trends and religion data entry and viewing (e.g., at step 525) can be used to provide tailored suggestions to the user, specifically the player. For example, a list of musical and film likes can be displayed to the user (step 574). The user can also access a customized list of articles and news trends of which align with the player's interests (step 576). Finally, details on religion can be accessed, for example to educate the player if he/she is interested in learning about a different religion, or is preparing to travel to a place where there is a prevalent religion of which the player is unaware (step 578).

If a player or other user opts to view/access press and TV records associated with the user development profile (e.g., at step 529), the player may have available a broad range of streaming events, both live and recorded, to view. In some embodiments, the streaming events can include the player himself and/or his direct competitors. In addition, micro advertising during the streaming of certain events will be available to advertisers (step 580). This is advantageous to advertisers as they will have a better idea of their audience before releasing the advertisement, thereby allowing the advertisers to specifically tailor the advertisement to the specific player or user. This also allows a team or academy to gain possible advertising income from the micro advertising.

Figure 11:
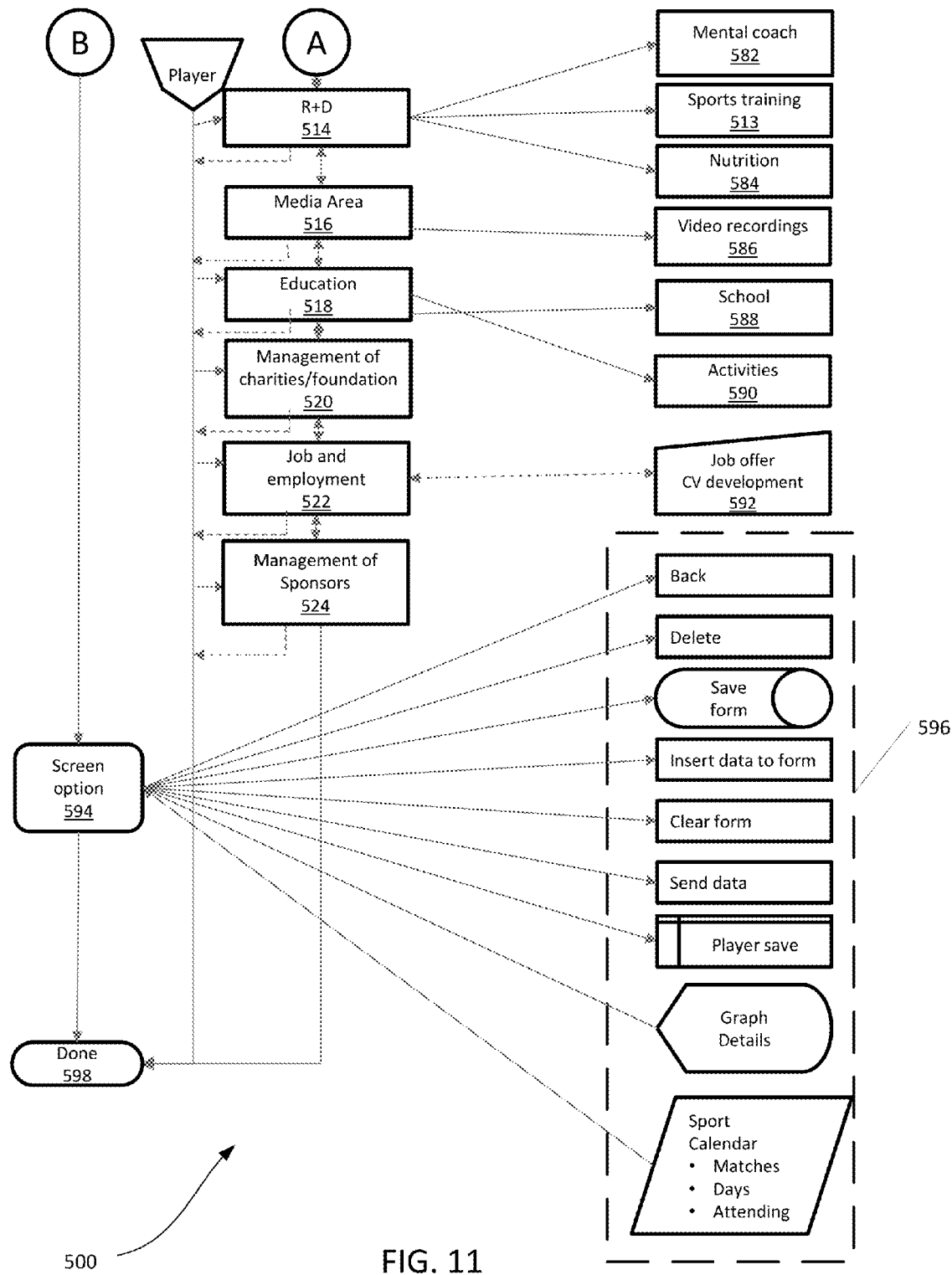

Referring now to FIG. 11, R&D step 514 could include contributing to, or accessing literature related to mental preparation, sport-specific training, medical data and/or nutrition (in steps 582, 584, and 586, respectively). For example, data can be collected to determine if certain types of player training lead to a lower instance of injury. In addition, studies correlating success of players with certain types of equipment can also be studied here. The player development system can be configured to allow both researchers and players access to the R&D step. In some embodiments, the players may see the results of studies to which they have been a part of and also studies that have been completed with other players.

Media reporting (e.g., at step 516) can include making and/or distributing video recordings (for example of competitions) (step 586). Photographs, audio interviews and other multimedia can also be available here. In some embodiments, the media available here can be only of the player or also include competitor media.

Education (e.g., at step 518) could include providing data related to academics (step 588) and/or related extra-curricular activities (step 590). In some embodiments, the player development system can provide a correlation of when and if certain education events (i.e. exams) affect the player's performance at competitions and during training Charity operations (e.g., at step 520) could include, for example, recording an athlete's contributions of time or money to charitable causes. In some embodiments, a company can also provide a charitable donation to the athlete or academy (step 520) to pay for competitions or equipment.

Employment (e.g., at step 522) may include, for example, updating or viewing a CV or resume (step 592). In some embodiments, the employment area also recommends certain profiles to certain user. For example, the employment area might include a trainer recommendation for beginners or younger players. Also, the employment area can also have the possibility to rank a user based on personal experience (i.e. a trainer). For example, a trainer with a legal background might make him/her better suited for sport representation than a trainer with a business background who is may be better suited for an administrator position.

Sponsorship (step 524) could include identifying future sponsors and/or tracking individual or team compliance against the requirements of current sponsors.

Screen options are available at any time (step 594) (as illustrated by Track B) to invoke user commands or receive data as illustrated by user interface steps 596. Preferably, when a user selects "save form," "insert data," "send data," or "player save" in interface steps 596, the process stores such data and calculates new player statistics and/or updates graphical evolution charts according to predetermined algorithms.

Figure 12:
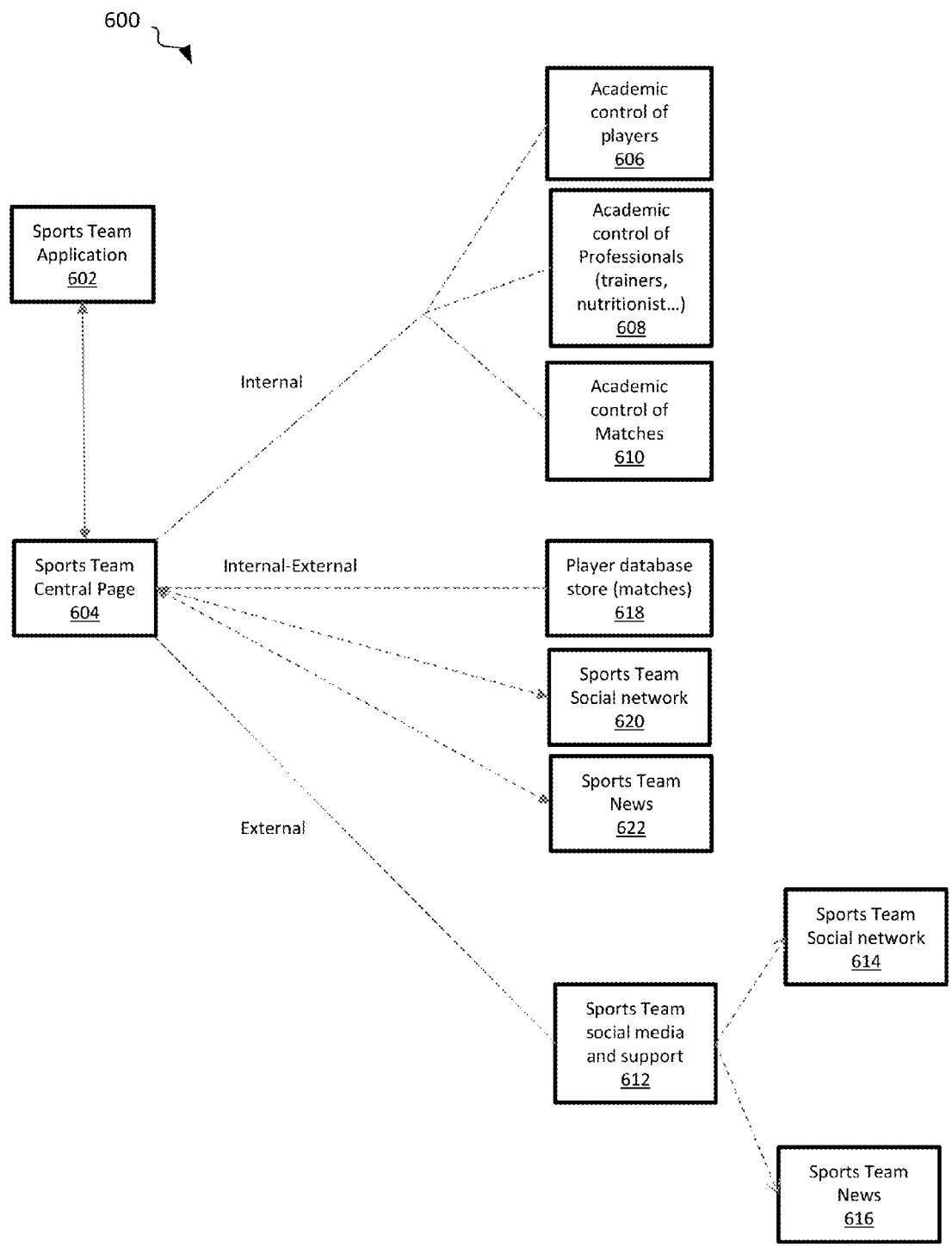
FIG. 12 illustrates a block diagram of internal and external interfaces to a player development system, according to an example embodiment.

FIG. 12 is a functional block diagram of internal and external interfaces to a player development system 600, according to an embodiment of the invention. The embodiment of FIG. 12 is particularly tailored to use in connection with a team sport, such as basketball, baseball, football, etc. in which a player's individual development is still managed, but within the context of results of both the user and his/her team. A sport team application 602 includes a central page 604. Internal functions 606, 608, and 610 allow for players, trainers, and administrators to input data, for example data associated with each player enrolled in an academy. An external interface 612 can push content to external social media networks 614 or news outlets 616, for instance in an effort to enhance individual and/or team ratings. Data for non-academy players (e.g., competitors or potential academy members) may be retrieved from an external data store 618. In embodiments of the invention, the athlete development system may maintain its own social network 620 and/or news feed 622.

Figure 13:
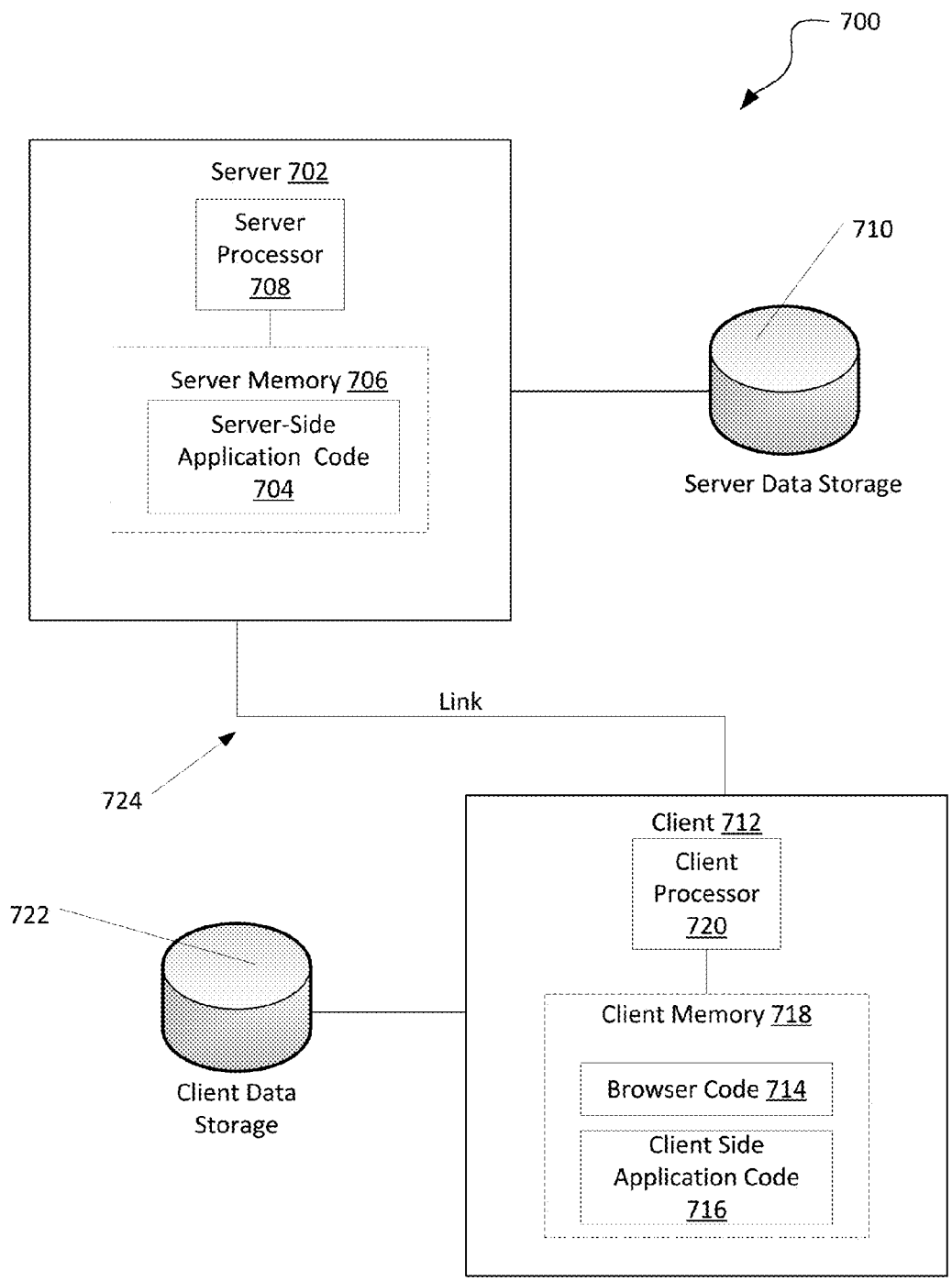
FIG. 13 illustrates a player development system, according to an example embodiment.

FIG. 13 is an architecture diagram of a player development system 700, according to an embodiment of the invention. The architecture diagram of system 700 provides additional illustration of interaction between a server and client device to deliver the systems and methods described herein to a user, for example within the network environment 100 of FIG. 1, using the server 108 of FIGS. 1 and 3. As shown therein, a server 702 (useable as server 108 above) is coupled to a client 712 via a link 724.

The server 702 may be an application server and may include server-side application code 704 that is stored in server memory 706. The server memory 706 could be or include, for instance, non-volatile memory device such as a flash drive, a hard disk drive, an optical disc, or other processor-readable medium, as noted above. The server memory 706 is linked to a server processor 708 that is configured to execute instructions embodied in the server-side application code 704. In addition, the server 702 may include or be coupled to a data store 710. Thus, in one respect, the server 702 may function as a data server.

The client 712 may be a thick client or a thin client, and may be fixed or mobile. The client 712 may include, for example, browser code 714 and client-side application code 716 that are stored in client memory 718. The client memory 718 could be or include, for instance, non-volatile memory device such as a flash drive, a hard disk drive, an optical disc, or other processor-readable medium. The client memory 718 is linked to a client processor 720 that is configured to execute instructions embodied in the client-side application code 716. The client 712 may also include or be coupled to a client data store 722. The link 724 may be or include a wired or wireless communication network. For instance, the link 724 could be or include the Internet or other network.

In some embodiments, together, the server 702 and client 712 are configured to execute the method and processes described above with reference to FIGS. 7-11. Any one or more of these processes may be embodied in the server-side application code 704 and/or the client-side application code 716 to configure the hardware associated with the server 702 and/or client 712.

Variations to the system illustrated in FIG. 13 are possible. For example, the player development system 700 could include more than one server, such as a separate application server and database server. Likewise, the system could include more than one client. The allocation of application code between the server(s) and the client(s) is subject to design choice. In yet another embodiment, the system could be implemented in a stand-alone computer that includes a processor and a memory device that contains processor-executable application code.

Referring now to FIGS. 14-21, example methods are disclosed that can be implemented using the systems described above to assist users of various types in managing development of a player by processing data in a player performance profile and generating one or more suggested actions (e.g., recommendations for a player, coach, sponsor, potential sponsor or scholarship award giver, parent, trainer, etc.) to improve performance of the player or otherwise manage player career aspects.

Figure 14:
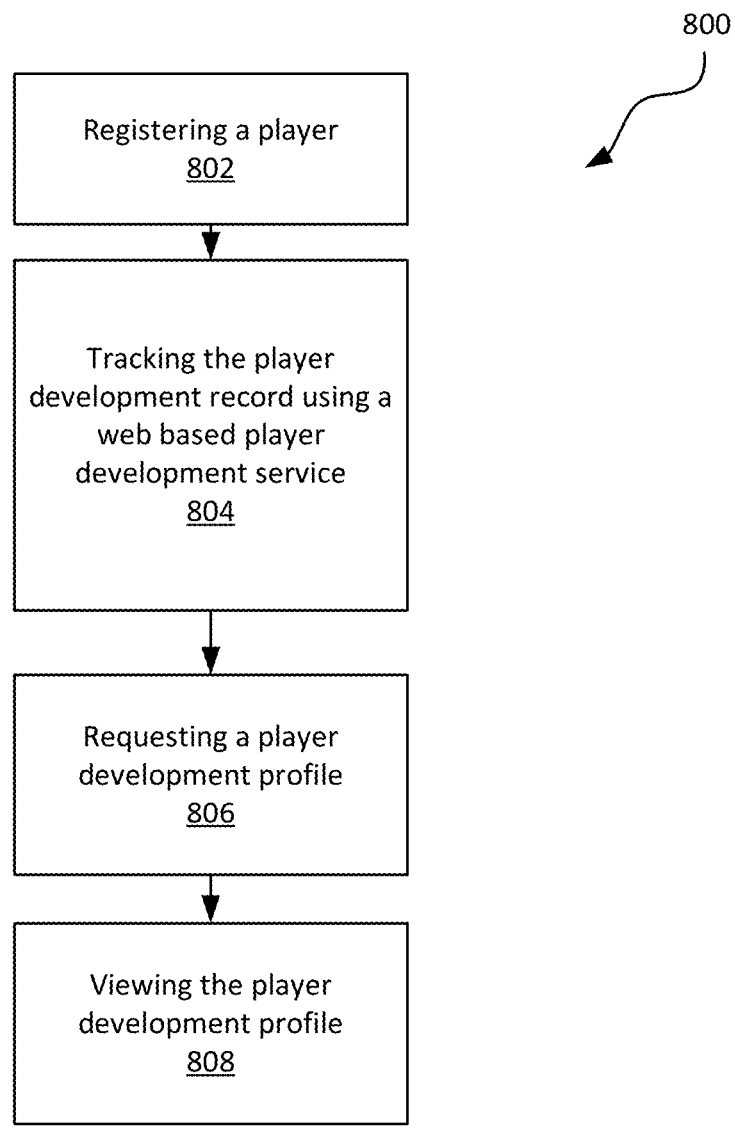
FIG. 14 illustrates an example method to assist in player development, according to an example embodiment.

FIG. 14 shows an example method 800 to assist in player development, performed by a user. A user can register a player in the player development system (step 802). In some embodiments, the registration can be completed in a web based player development service the user can then track a player development record by using the web based service (step 804). In some embodiments, an aggregate record can be created at the web based service where each player development record includes at least training data, competition data and biographic data. The user can then request a player development profile for a particular player (step 806) using the web based player development service. After requesting the profile, the user can then view the player development profile (step 808) that is generated by the player development system, specifically an automated player performance application of the web based player development service.

Figure 15:
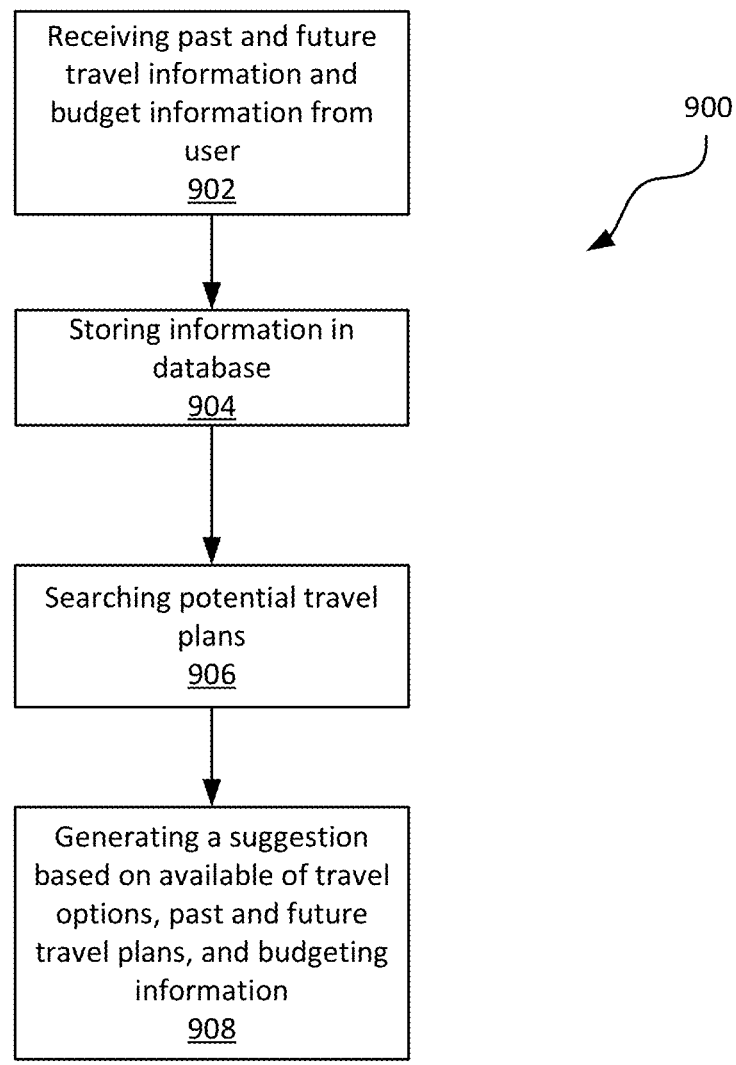
FIG. 15 illustrates an example method to assist in player development, specifically a method of generating a travel recommendation, according to an example embodiment.

FIG. 15 shows an example method 900 to assist in player development, specifically a method of generating a travel recommendation. In this example application of the system, the system itself, for example based on operation of server 108, can generate recommendations based on information in a player profile, as received from one or more users.

In the embodiment shown, the method 900 includes receiving past and future travel information and travel budget information from the user (step 902). The method 900 can then include storing the information received in a database (step 904). The method 900 can include searching potential travel plans (step 906) based on the information stored in the database. This can include, for example, searching the internet or can include searching the database for other like travel plans. The method 900 also includes generating a travel suggestion, or plan, based on available travel options, past and future travel plans, and budgeting information (step 908). In some embodiments, upon request from a user, the method can also include displaying the travel suggestion on the player development profile. Additionally, the recommendation can be based on input of other users, group travel discounts negotiated by an entity (e.g., an academy), discounts made available to the player, and evaluations of facilities by other players, such as relating to the quality of accommodations, food, and proximity to event and entertainment locations). This can also include a database of the types of information that would be needed by the player for such travel, such as a visa, foreign currency, medical certificates, or other important documents.

Figure 16:
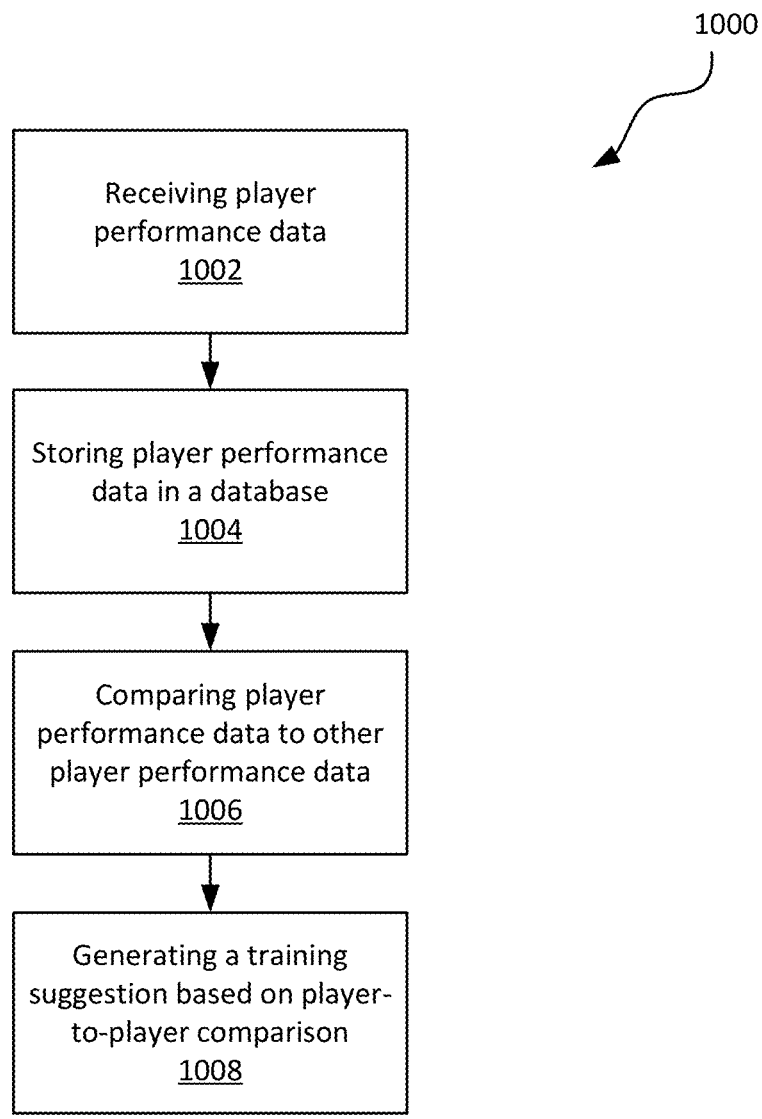
FIG. 16 illustrates an example method to assist in player development, specifically a method of generating a training recommendation, according to an example embodiment.
Figure 17:
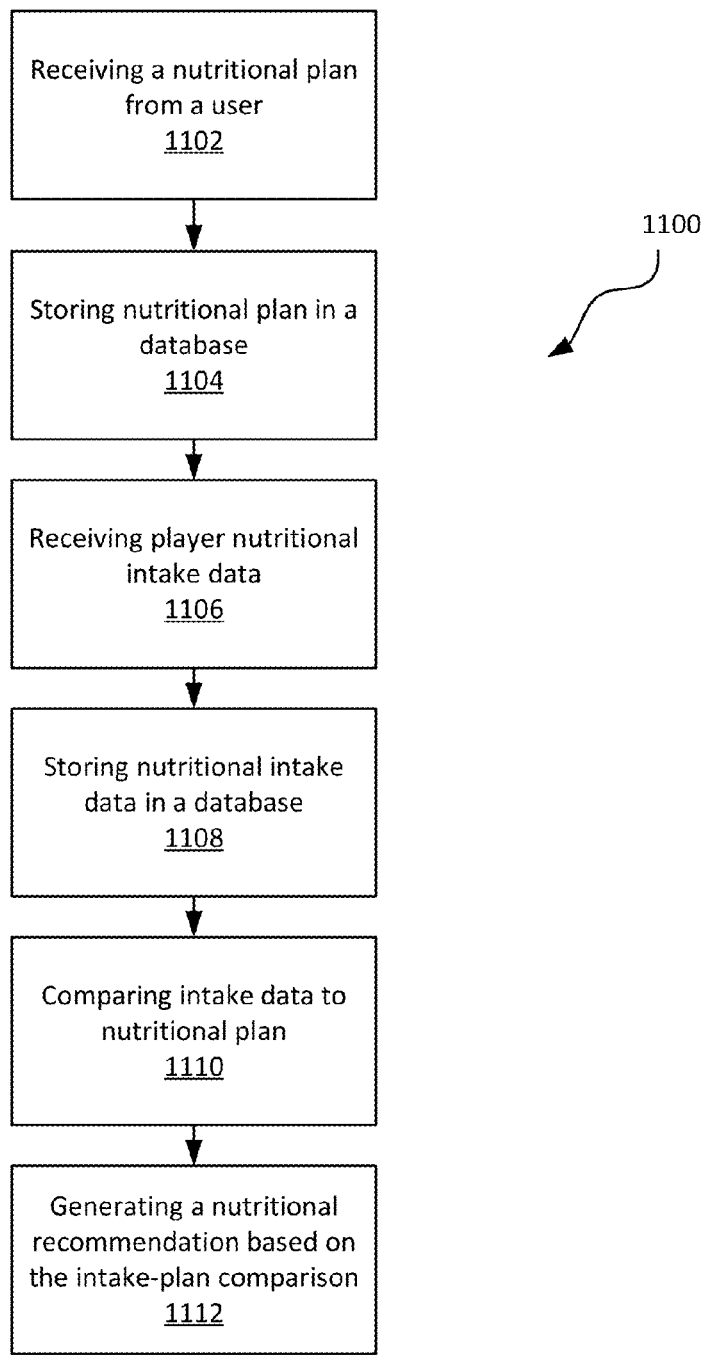
FIG. 17 illustrates an example method to assist in player development, specifically a method of generating a nutrition recommendation, according to an example embodiment.

FIG. 16 shows an example method 1000 to assist in player development, specifically a method of generating a training recommendation. The method 1000 can include receiving player performance data 1002. The method 1000 can also include storing 1004 the data received at step 1002 in a database. The method 1000 can also include comparing the player performance data received at step 1002 to player performance data of other players, data that is already stored in the database 1006. Also, the method may include, generating a training recommendation based on the comparison of player performance data. For example, if the targeted player's performance data is lacking in comparison to another particular player, the player development system can generate a suggestion stating that the player is falling behind in his/her performance and the system may recommend the player increase his/her physical training FIG. 17 shows an example method 1100 to assist in player development, specifically a method of generating a nutrition recommendation. In this example application of the system, the system itself, for example based on operation of server 108, can generate recommendations based on information in a player profile, as received from one or more users.

In the embodiment shown, the method 1100 can include receiving a nutritional plan from a user (step 1102), for example via a web or application user interface. The method 1100 can also include storing the nutritional plan in a database (step 1104), and in particular associated with a player development profile. The method 1100 can also include receiving a player's nutritional intake data (step 1106), for example via a web or application user interface, and storing the intake data in a database (step 1108) associated with a player development profile.

In the embodiment shown, the method 1100 may also include comparing the intake data to the nutritional plan (step 1110) to see if the intake data matches what is required by the nutritional plan. The method can also include generating a nutritional recommendation (step 1112) based off the comparison of the intake data at the nutritional plan. For example, a nutritional recommendation might instruct the player to boost calorie intake by 20%, or to decrease sodium intake by a certain amount based on what the player had to eat in the recent past, the player's practice or competition performance when using a similar diet, or other data associations.

For example, the player's nutritional intake may be monitored by an RFID system in which the RFID system recognizes a player carrying a tray of food at a designated facility (i.e. training headquarters). The food on the player's tray can be exposed to a camera at a check-out counter and food dishes with a certain volume and texture can be recognized, thereby allowing for the real time calculation of caloric intake.

The nutrition recommendation can be based on diet of the player, and in particular annual and/or tournament diets for a particular player, including caloric and volumetric calculations.

Figure 18:
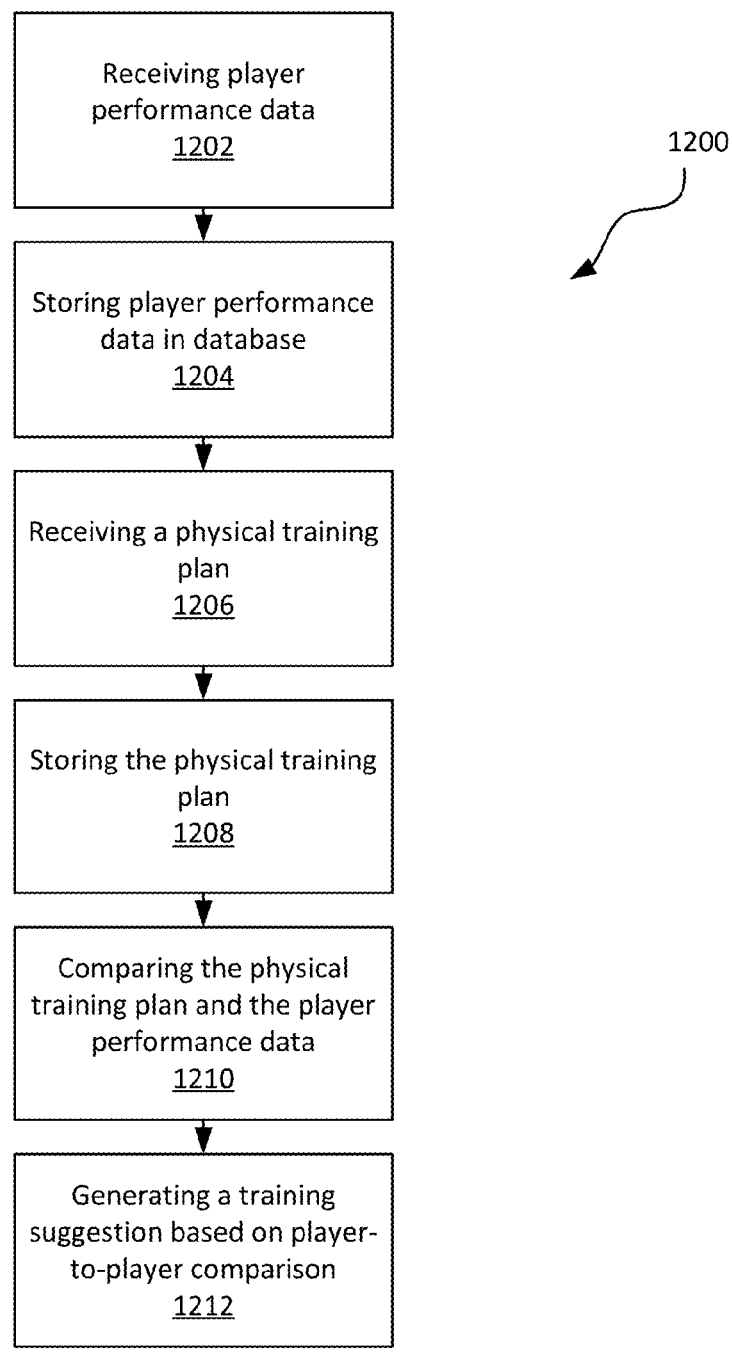
FIG. 18 illustrates an example method to assist in player development, specifically a method of generating a training recommendation, according to an example embodiment.

FIG. 18 shows an example method 1200 to assist in player development, specifically a method of generating a training recommendation. In this example application of the system, the system itself, for example based on operation of server 108, can generate recommendations based on information in a player profile, as received from one or more users.

In the embodiment shown, the method 1200 can include receiving player performance data (step 1202) and storing such data in a database (step 1204), for example in association with a player development profile to which the user has access. The method 1200 can also include receiving a physical training plan (step 1206) and storing such a plan in a database (step 1208). The method 1200 can also include comparing the physical training plan and the player performance data (step 1210) and then generating a training suggestion (step 1212) based on the comparison. For example, a player may upload information from a recent training session that included a mile run time. The physical training plan might indicate that the player is to be running at mile at a certain time at a point in the player's training. The training recommendation generated might outline a more strenuous cardio workout if the player's performance data indicates that the player was below the target time outlined in the physical training plan.

Figure 19:
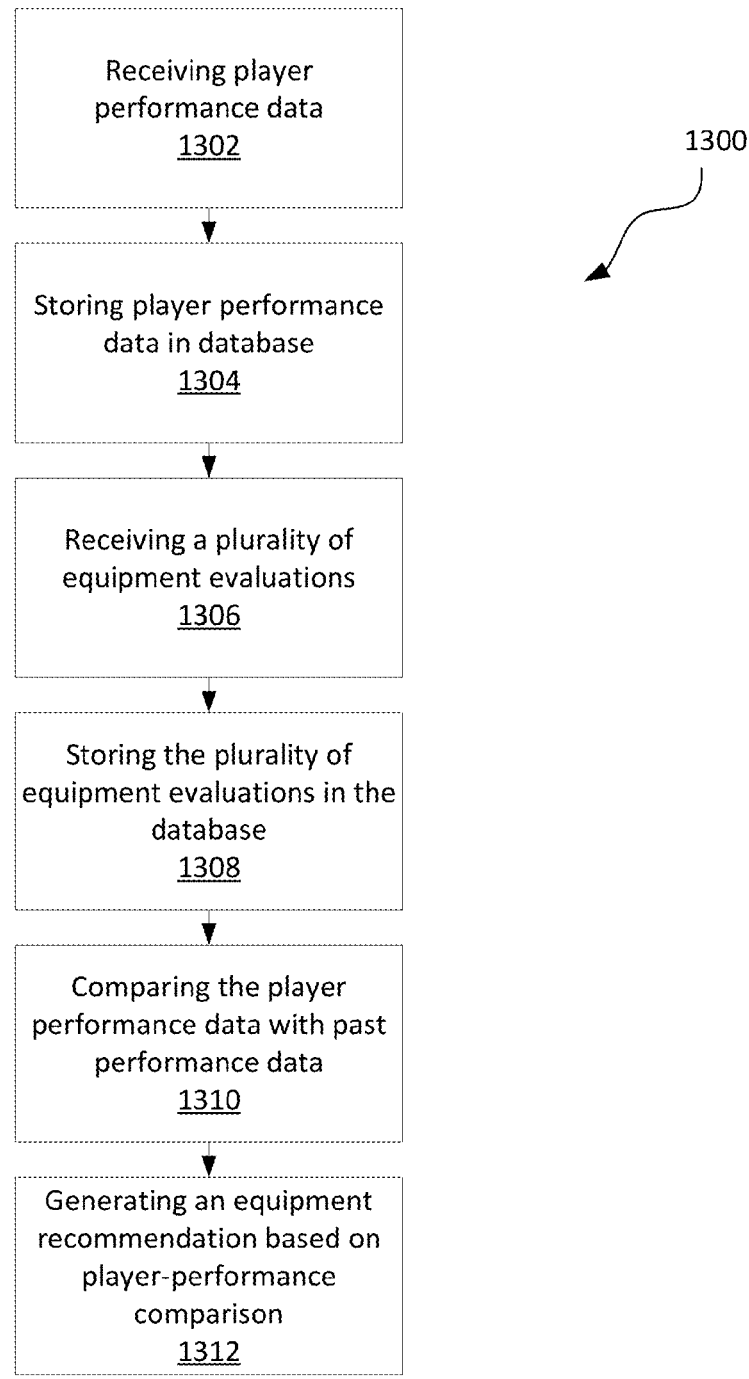
FIG. 19 illustrates an example method to assist in player development, specifically a method of generating an equipment recommendation, according to an example embodiment.

FIG. 19 shows an example method 1300 to assist in player development, specifically a method of generating an equipment recommendation. In this example application of the system, the system itself, for example based on operation of server 108, can generate recommendations based on information in a player profile, as received from one or more users.

The method 1300 can include receiving player performance data 1302 and storing such data in a database (step 1304). The method 1300 can also include receiving a plurality of equipment evaluations (step 1306) and storing the plurality of evaluations (step 1308) in the database. The method 1300 may also include comparing the player performance data received with past performance data of the same player. The method may also include generating an equipment suggestion based on the player performance data comparison. For example, the player performance data may indicate that a tennis player struggles to perform at a top level on clay courts. The equipment evaluations stored in the database may indicate high marks for a certain pair of shoes on clay courts. Accordingly, the equipment recommendation will recommend that pair of shoes to the player whose data indicates she struggles on clay courts.

Figure 20:
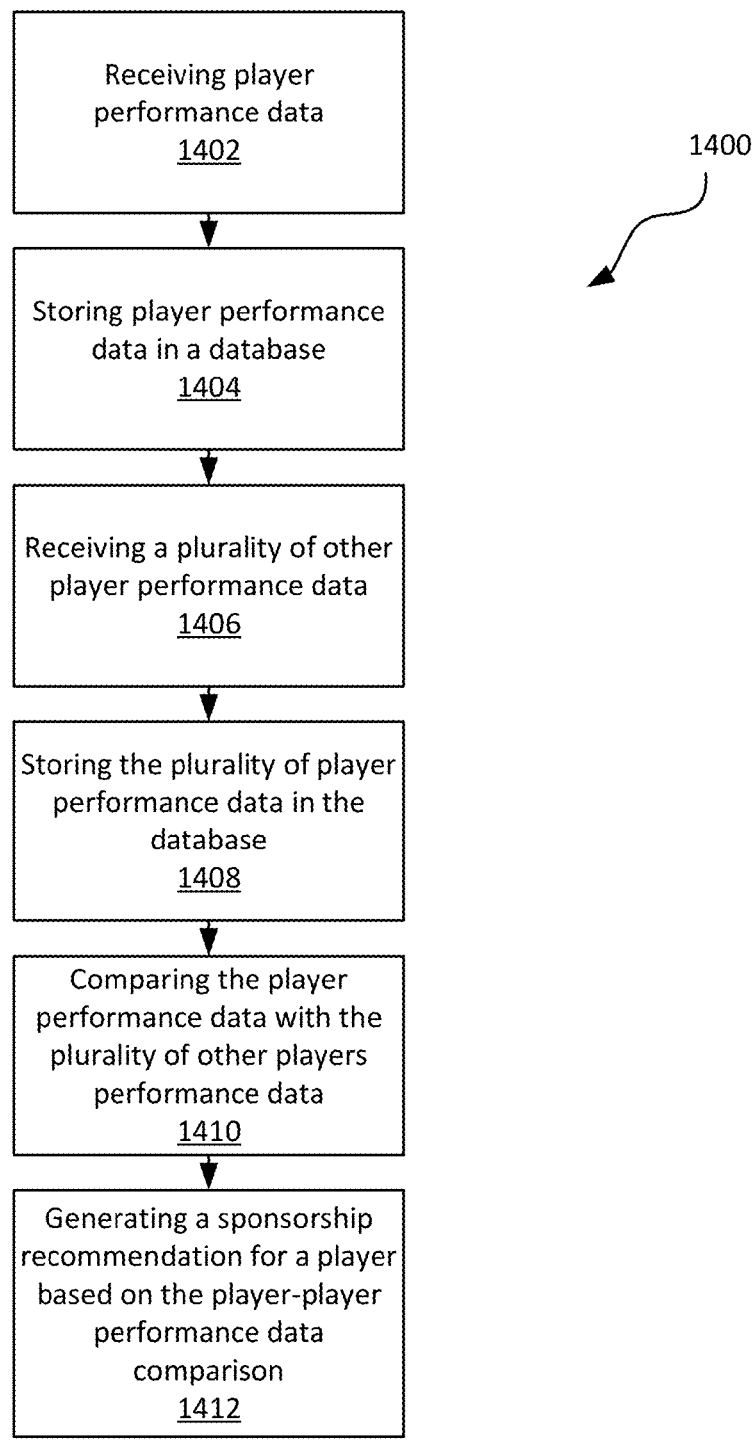
FIG. 20 illustrates an example method to assist in player development, specifically a method of generating a sponsorship recommendation, according to an example embodiment.

FIG. 20 shows an example method 1400 to assist in player development, specifically a method of generating a sponsorship recommendation. As above, in this example application of the system, the system itself, for example based on operation of server 108, can generate recommendations based on information in a player profile, as received from one or more users.

In the embodiment shown, the method 1400 can include receiving player performance data (step 1402) and storing such data in a database (step 1404) associated with a player management profile. The method 1400 can also include receiving a plurality of other player performance data (step 1406) and storing the plurality of other player performance data (step 1408) in the database. The method 1400 may also include comparing (step 1410) the player performance data with past performance data of the plurality of other players performance data. The method 1400 may also include generating a sponsorship recommendation (step 1412) for a player based on the player-to-player performance data comparison. In other embodiments, the method 1400 may also include receiving sponsorship data for players that are already sponsored and indicating such existing sponsorship in the recommendation.

Figure 21:
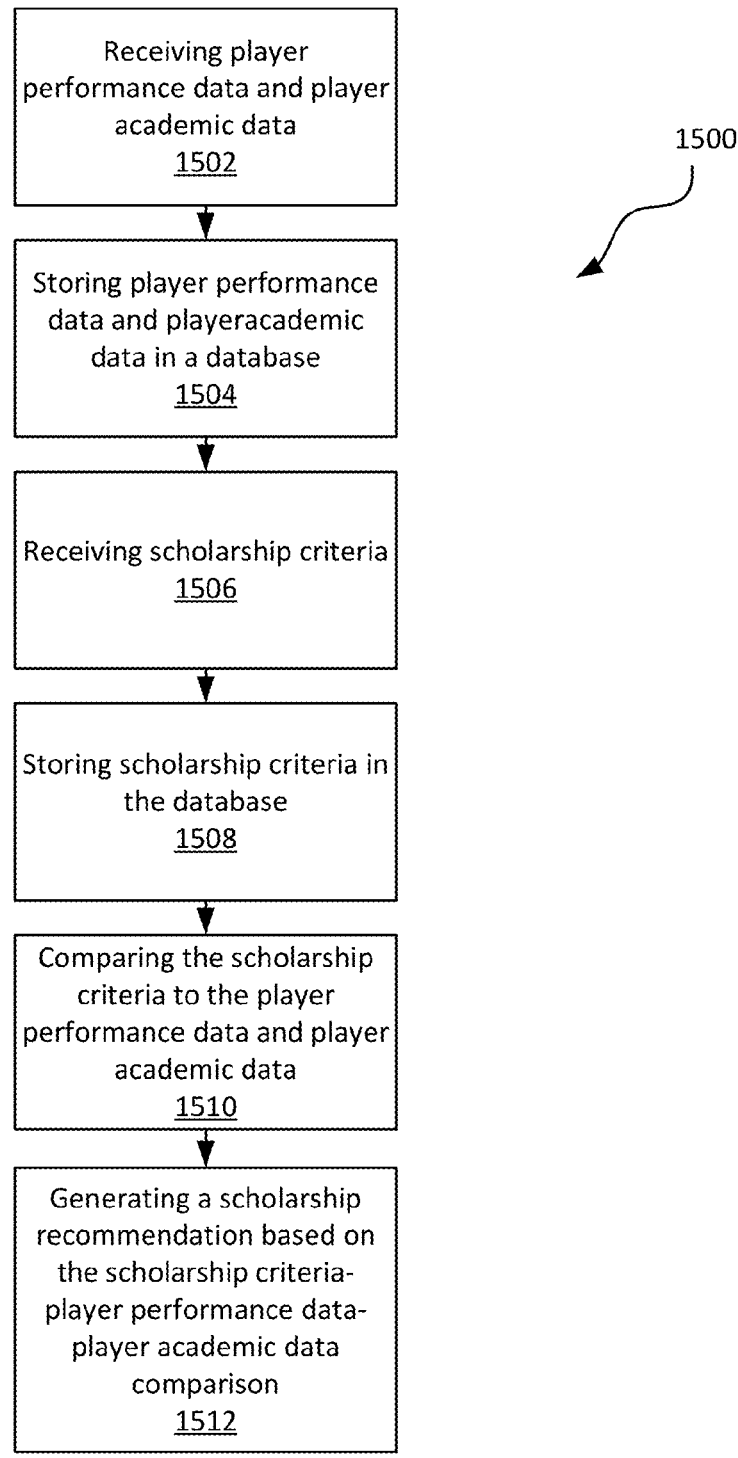
FIG. 21 illustrates an example method to assist in player development, specifically a method of generating a scholarship recommendation, according to an example embodiment.

FIG. 21 shows an example method 1500 to assist in player development, specifically a method of generating a scholarship recommendation. In this example application of the system, the system itself, for example based on operation of server 108, can generate recommendations based on information in a player profile, as received from one or more users.

In the embodiment shown, the method 1500 can include receiving player performance data and player academic data (step 1502) and storing such data in a database (step 1504). The method 1500 can also include receiving scholarship criteria (step 1506) and storing such criteria (step 1508) in the database. The method 1500 can also include comparing the scholarship criteria to the player performance data and the player academic data (step 1510). The method 1500 can also include generating a scholarship recommendation (step 1512) based on the comparison. For example, if a player performance data indicates a player has performed at top levels and his academic criteria shows that he has kept adequate marks in education, a scholarship recommendation will be generated.

Referring generally to FIGS. 14-21, it is noted that although in some embodiments recommendations are automatically generated, in some other embodiments the methods are accomplished by the player development system 100 by presenting to an appropriate user a collection of information that allows the user to develop recommendations. In this way, a coach, trainer, academy, or other entity can apply its expertise in tracking and managing player development. Accordingly, in some embodiments, generation of recommendations includes at least some user input in developing and implementing such recommendations.

Referring now to FIGS. 22-26, a set of representative user interfaces are illustrated that can be used in implementing the player development system 100 of the present disclosure. The user interfaces of FIGS. 22-26 can be, for example, generated at a server, such as server 108, for presentation on a user device, such as devices 102, 104 of FIG. 1.

Figure 22:
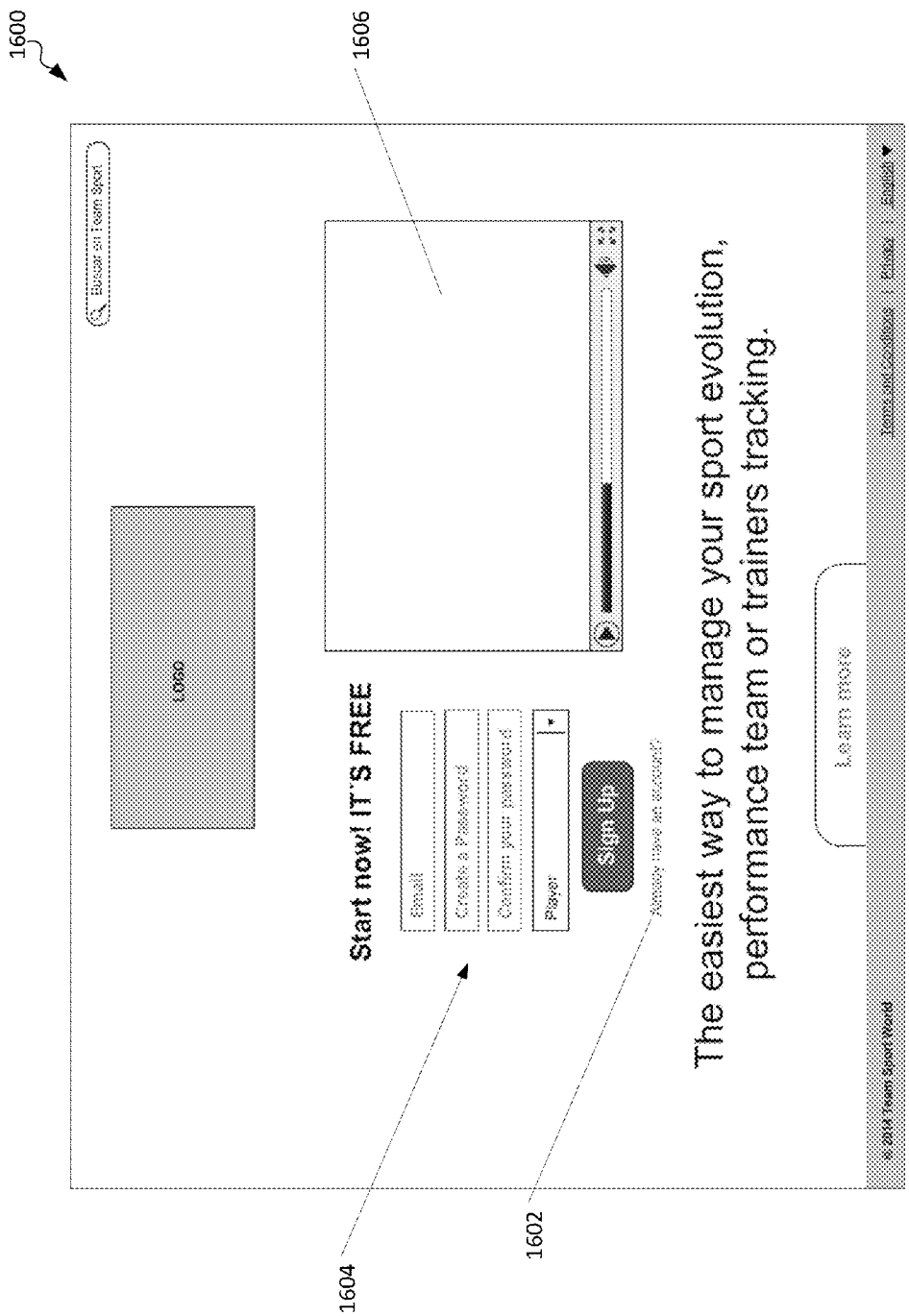
FIG. 22 illustrates an example login user interface for a player development system, according to an example embodiment.

FIG. 22 shows an example login user interface 1600. The user interface 1600 can include fields so that the user may sign into a previously created account 1602 or create a new account 1604. Additionally, the login user interface 1600 can include general information about the player development system, sometimes in the form of multimedia 1606 (e.g. an overview video).

Figure 23:
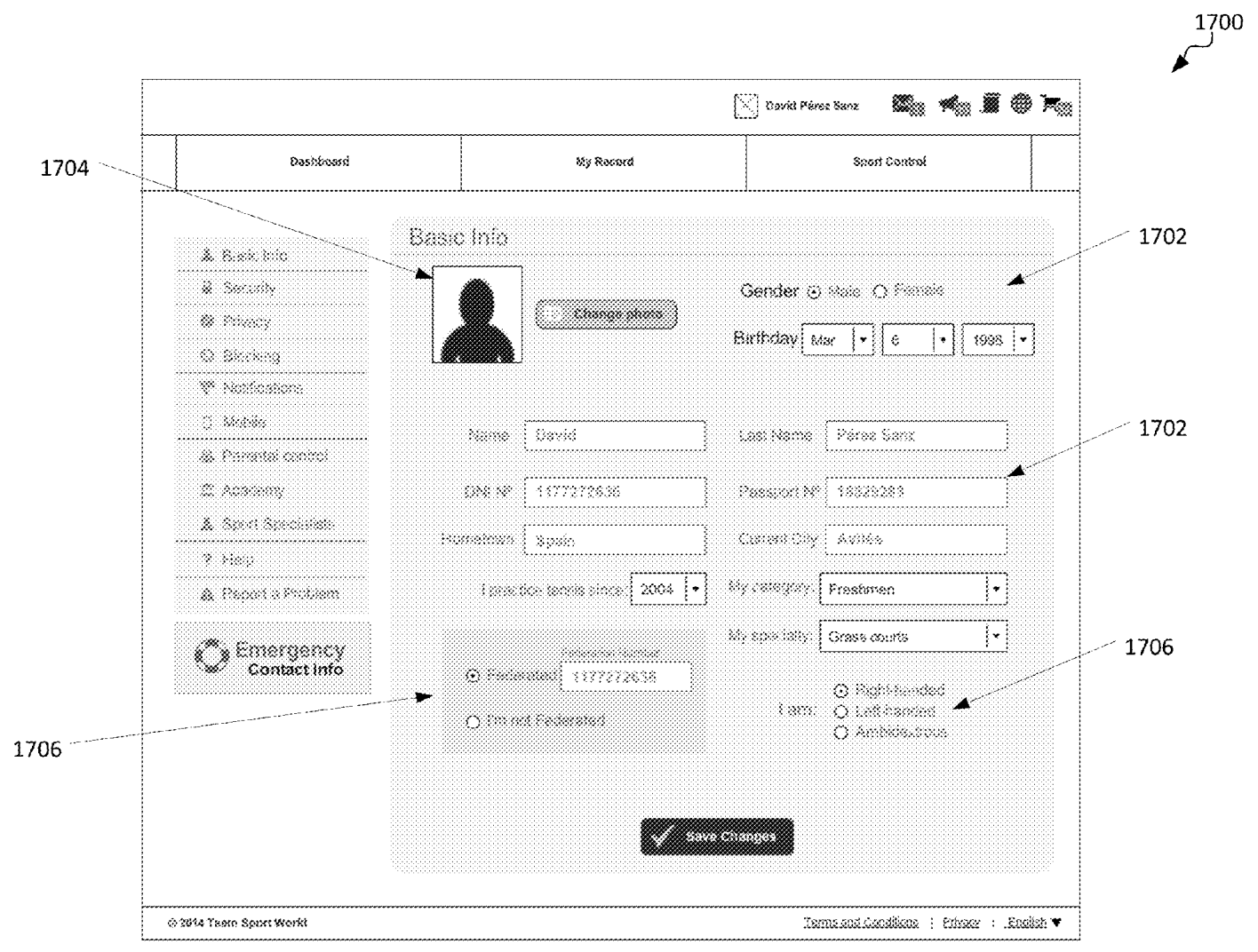

FIG. 23 shows an example player biographic information page user interface 1700. Here, the player, trainer, or administrator may enter biographic information of a player. Example information can include, but is not limited to, personal data information 1702, a photo of the player 1704, and certain athletic attributes and memberships 1706.

Figure 24:
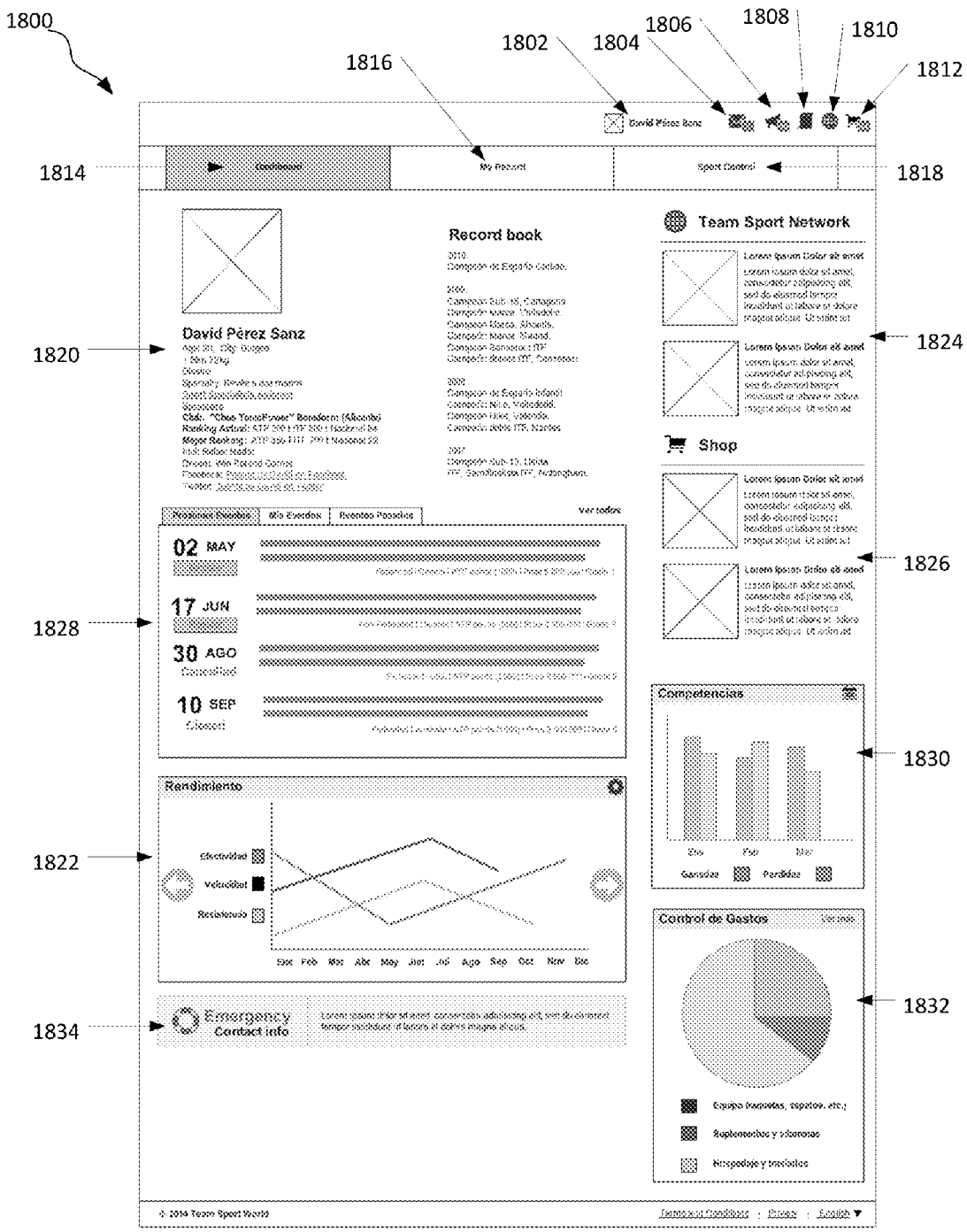
FIG. 24 illustrates an example player development profile user interface for a player development system, according to an example embodiment.

FIG. 24 shows an example player development profile user interface 1800. Here, the user interface 1800 indicates that the user is a player 1802. Additionally, top ribbon links to personal messages 1804, notifications 1806, news 1808, team sport network 1810 and shopping 1812 can exist. In the depicted embodiment, the player has the three main sub user interface choices including the dashboard 1814 (the depicted user interface), my record 1816, and sport control 1818. My record user interface 1816 can include information regarding past performances. Sport control user interface 1818 can contain information including, but not limited to, physical trainings, technical training, motivation training, nutritional information, medical information, and academic information. As shown, the dashboard user interface 1814 can include, but not be limited to, biographic player information 1820, past performance data 1822, associated player information 1824, shopping data 1826, competition/training/event data 1828, a graphical representation of past performance data 1830, expense data 1832 and, in some embodiments, emergency contact information 1834.

Figure 25:
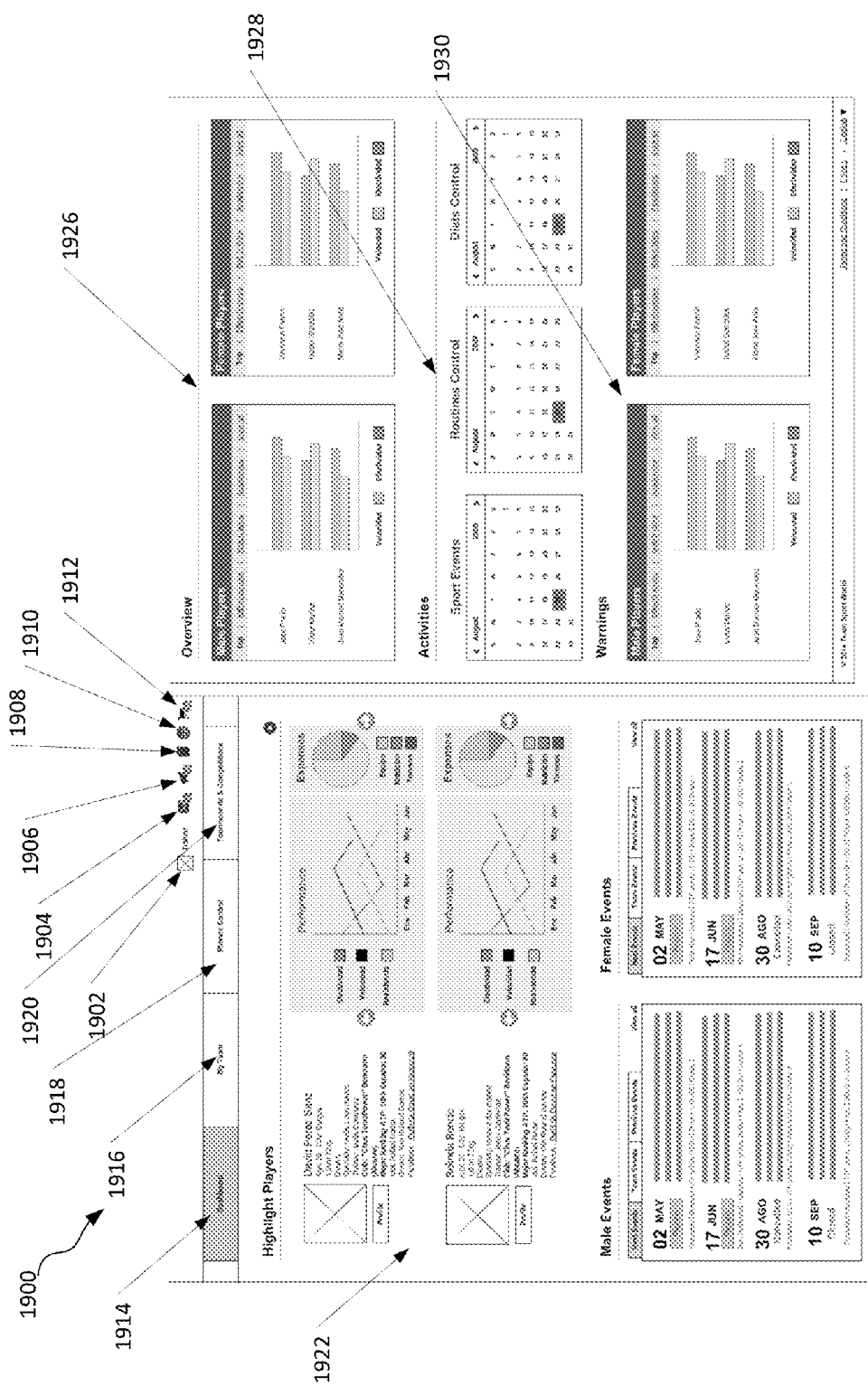
FIG. 25 illustrates an example player development profile user interface for a player development system, according to an example embodiment.

FIG. 25 shows an example player development profile user interface 1900. Here, the user interface indicates that the user is a trainer 1902. Like when the user is a player, the trainer also has top ribbon links to personal messages 1904, notifications 1906, news 1908, team sport network 1910, and shopping 1912. In the depicted embodiment, the trainer has the four main sub user interface choices being dashboard 1914 (the depicted user interface), my team 1916, players control 1918, and tournaments and competitions 1920. The my team user interface 1916 can contain information including, but not limited to, sport evolution of team players, a comparative analysis between team members, contact information for team players, expense information, and media (e.g. motivation media, speeches, etc.). The players control user interface 1918 can include, but not be limited to, physical trainings, technical training, motivation training, nutritional information, medical information, and academic information for players on the team or generally associated to the trainer. The tournaments and competitions user interface 1920 can contain information including, but not limited to, tournament information, past tournament results and information, and past tournament valuations. The past tournament valuation information can further include information regarding judges, accommodations, food expenses, transportation information, technical level, and over organization of the tournament.

As shown, the dashboard user interface 1914 for a trainer user can contain information including, but not limited to, player information of at least one player 1922, event information 1924, analysis of past player performance 1926, activity schedules 1928, and warning information regarding past player performance signaling abnormal player performance 1930.

Figure 26:
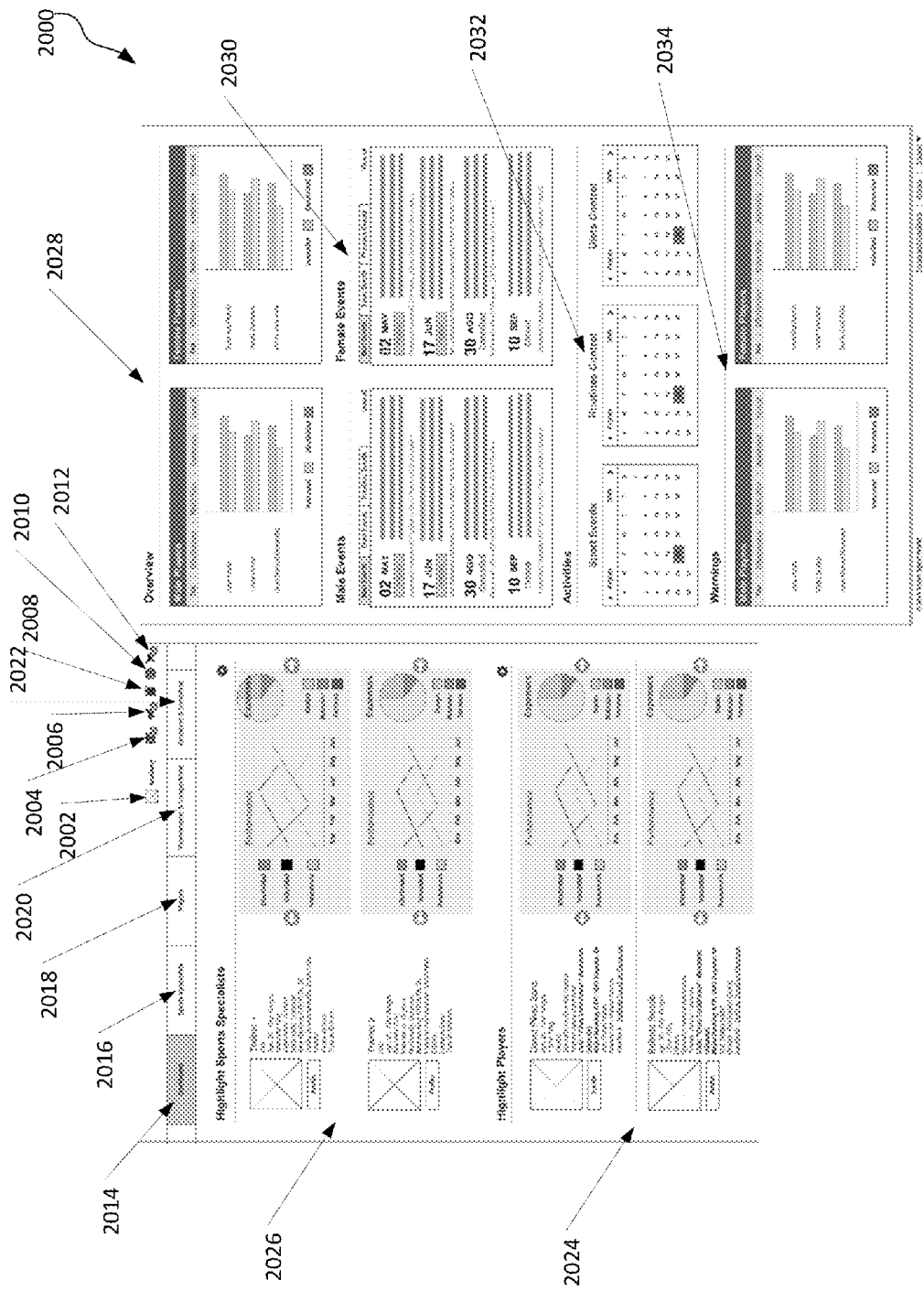
FIG. 26 illustrates an example player development profile user interface for a player development system, according to an example embodiment.

FIG. 26 shows an example player development profile user interface 2000. Here, the user interface indicates that the user is an administrator 2002. Like when the user is a player or trainer, the administrator also has top ribbon links to personal messages 2004, notifications 2006, news 2008, team sport network 2010 and shopping 2012. In the depicted embodiment, the administrator has the five main sub user interface choices being dashboard 2014 (the depicted user interface), sports specialists 2016 (i.e. trainers), players 2018, tournaments and competitions 2020, and sponsors and donations 2022. The sports specialists user interface 2016 includes information relating to, but not limited to, trainer information, player/trainer relationship information, ranking of trainers based on player performance, trainer evaluations completed by players. The player user interface 2018 can contain information including, but not limited to, sport evolution of players, a comparative analysis between players, player ranking information, and player valuation completed by corresponding trainers. The tournaments and competitions 2020 user interface can contain information including, but not limited to, tournament information, past tournament results and information, and past tournament valuations. The past tournament valuation information can further include information regarding judges, accommodations, food expenses, transportation information, technical level, and over organization of the tournament. The sponsors and donations user interface 2022 can contain information including, but not limited to, sponsor identities, players who are designated as sponsorable, and a sponsors search.

As shown, the dashboard user interface 2014 for an administrator user can contain information including, but not limited to, information for one or more players 2024, information of one or more sports specialists (trainers) 2026, analysis of past player performance 2028, event information 2030, activity schedules 2032, and warning information regarding past player performance signaling abnormal player performance 2034.

It is noted that, as seen in the user interfaces of FIGS. 22-26, different users will have different roles and access rights with respect to a particular user. As illustrated in FIGS. 27-31, additional information regarding arrangement and organization of a player development record is provided, including the types of data included in each player development record, as well as inheritance and access rights associated with a player development record of a particular player.

Figure 27:
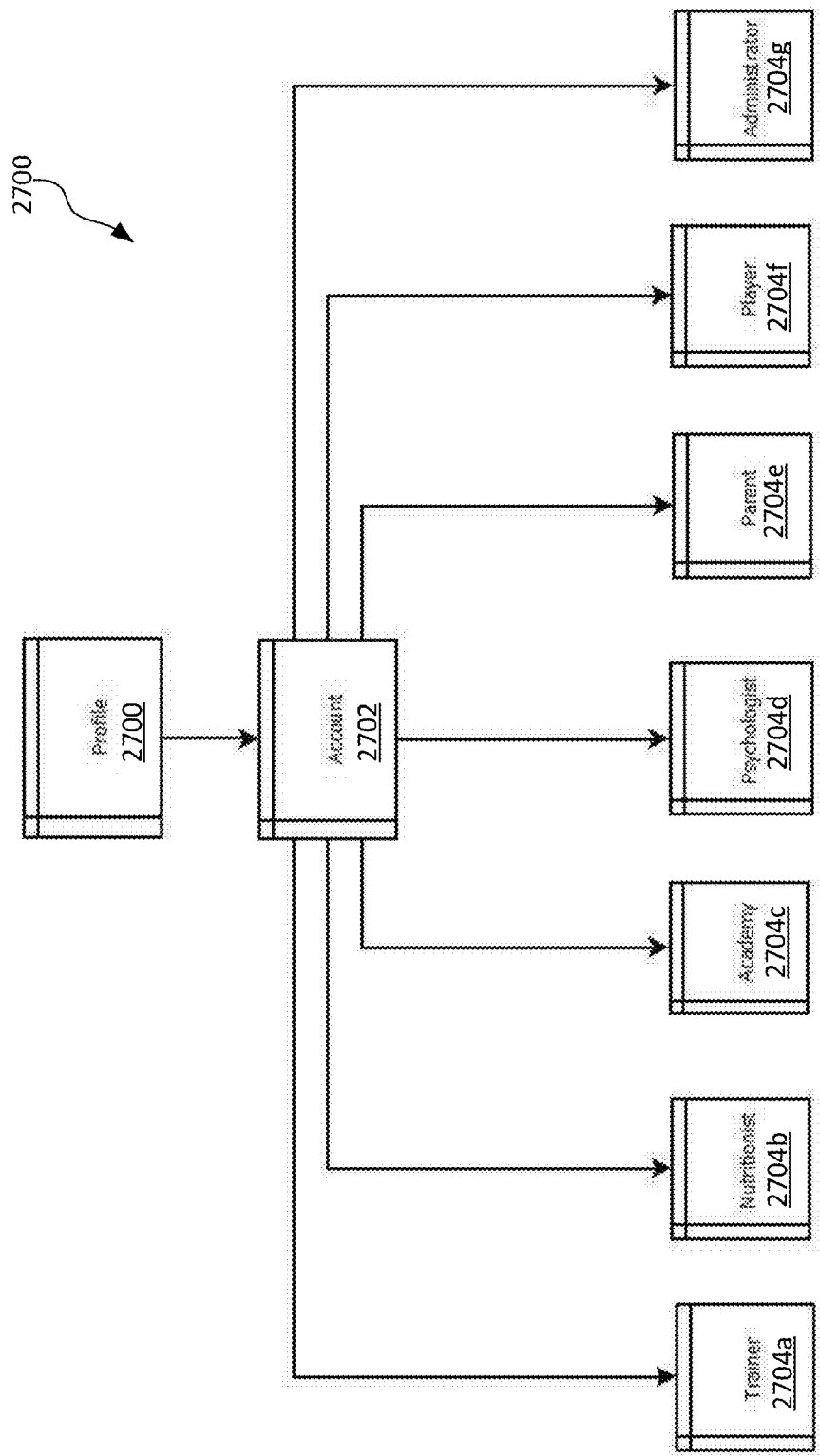
FIG. 27 illustrates an example player development profile user interface for a player development system, according to an example embodiment.

Referring first to FIG. 27, a player development profile 2700 is shown. The player development profile 2700 can store the player data associated with a particular player account 2702. That account can define access rights to a plurality of users 2704, such as a trainer 2704a, a nutritionist 2704b, an academy 2704c, a psychologist 2704d, a parent 2704e, a player 2704f, and an administrator 2704g. Of course, other users could be defined associated with the account, which provides access to the player development profile.

Figure 28:
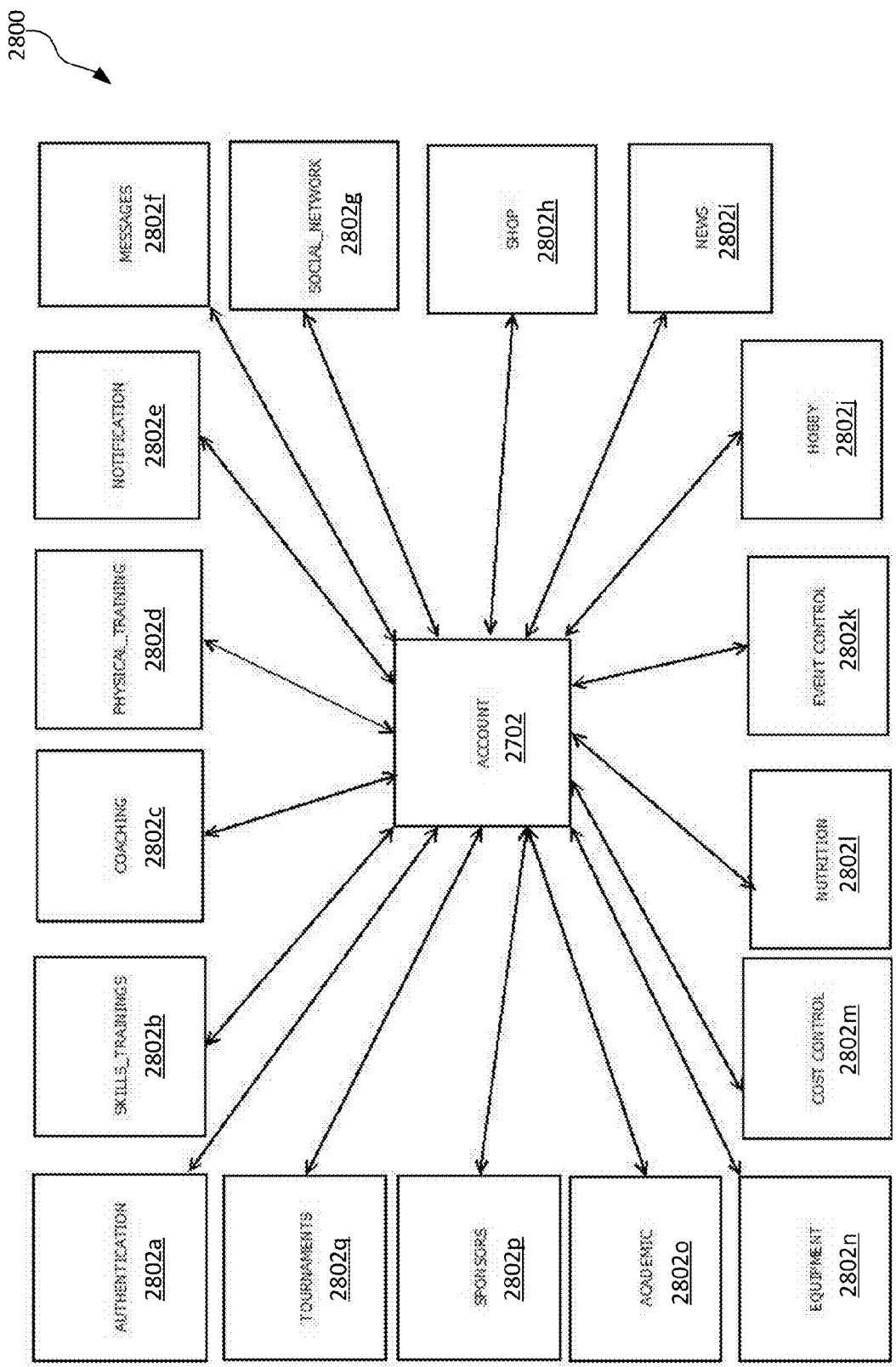
FIG. 28 illustrates a data relationship outline showing how each of a plurality of types of data is integrated into an example player development profile, according to an example embodiment.

As seen in FIG. 28, a data relationship outline 2800 shows how each of a plurality of types of data are integrated into the player development profile 2700 of FIG. 27. In particular, any data received at the player development profile is received at the user account 2702, which receives various types of data, as illustrated, including authentication data 2802a, which can include a user login and password for each user having a particular role, as well as data typically received by or accessed by specific users. This can include skills training data 2802b typically received from a coach or player, coaching data 2702c received from a coach or academy, physical training data 2702d received from a player, coach, or trainer, and notification data 2702e relating to information to be communicated to the player. Additionally, various inter-player data can be received, such as messages 2802f from other players, social networking communications 2802g, or shopping data 2802h, associated with the player's shopping preferences for goods associated with the sport. Additionally, news 2802i associated with the player can be received from a player, coach, or other third party source. Data from the player themselves such as hobby information 2802j, event control information 2802k (e.g., the player's location), nutrition information 2802l can be received. Similarly, a player or parent may be able to provide cost control information 2802m, equipment information 2802n, the player, parent, and/or academy may be able to provide or view academic information 2802o, while sponsor information 2802p and tournament information 2802q may be more public and/or widely accessible and/or editable.

Figure 29:
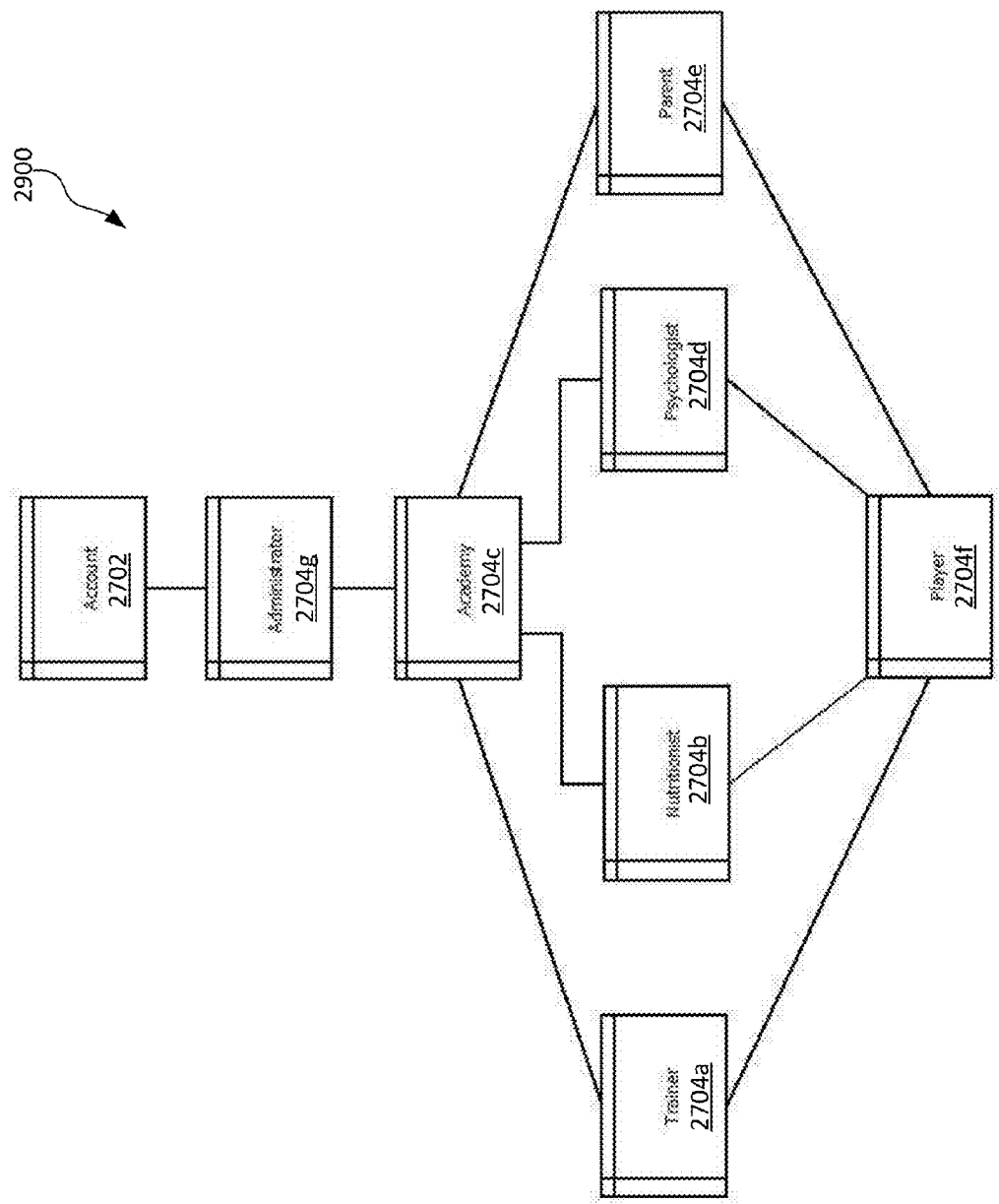
FIG. 29 illustrates an example arrangement depicting inheritance among example users associated with a particular account, according to an example embodiment.

FIG. 29 illustrates an example arrangement 2900 depicting inheritance among example users associated with a particular account. At a first level, the account 2702 defines usage rights to the account, which are inherited in full by an administrator 2902. An academy 2704c may receive some subset of those access rights, as the academy may be the entity subscribing to the services provided by the system 100 described herein.

The academy may grant additional specific rights to a player development profile to other entities, such as a trainer 2704a, nutritionist 2704b, psychologist 2704d, or parent 2704e as noted in FIG. 27. A player 2704f can access data entered by any of those entities (trainer 2704c, nutritionist 2704b, psychologist 2704d, or parent 2704e) for purposes of adding to or viewing his or her player development profile to access recommendations relating to that data.

Figure 30:
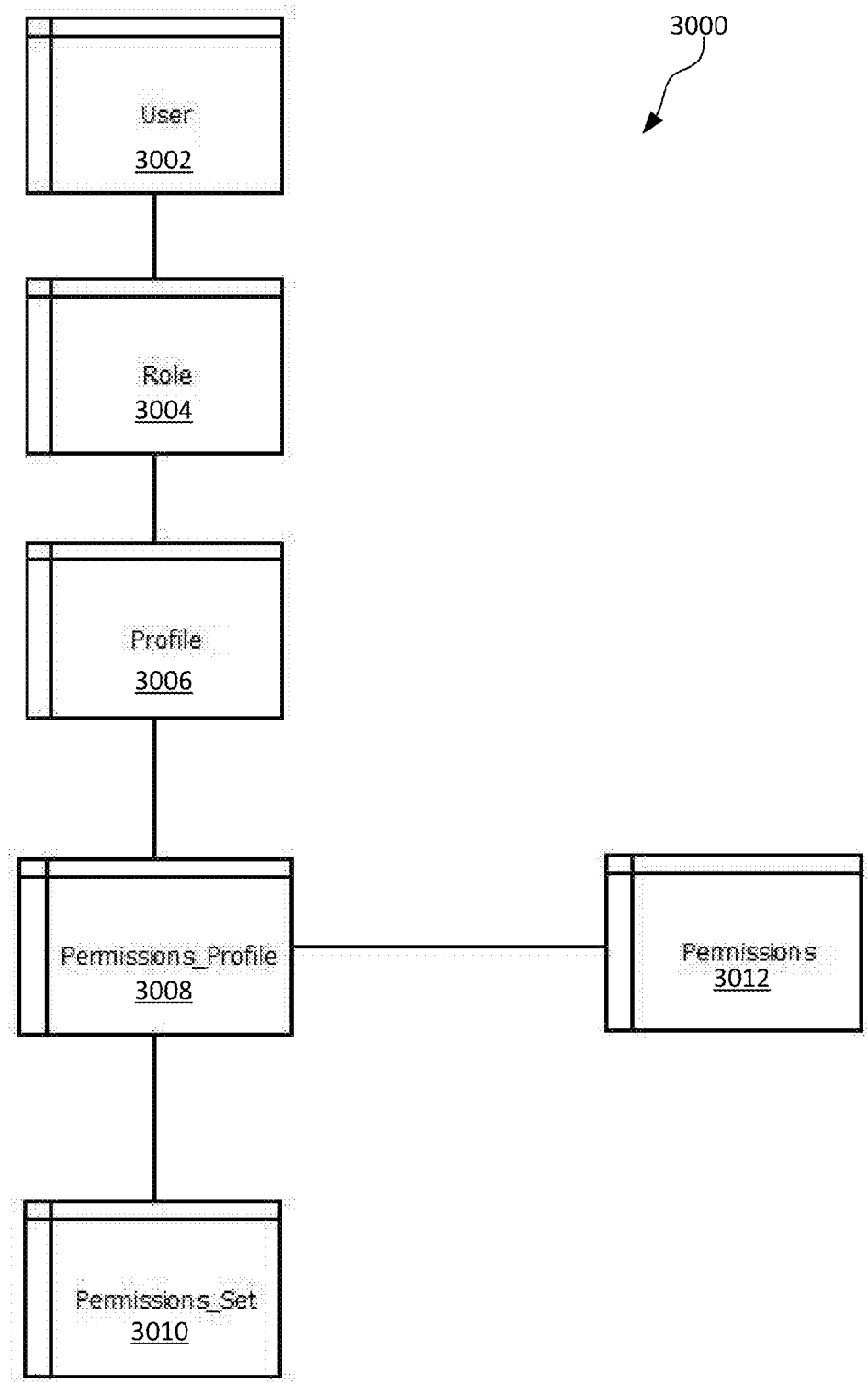
FIG. 30 illustrates an example arrangement by which various users of the player development system can have roles assigned, according to an example embodiment.
Figure 31:
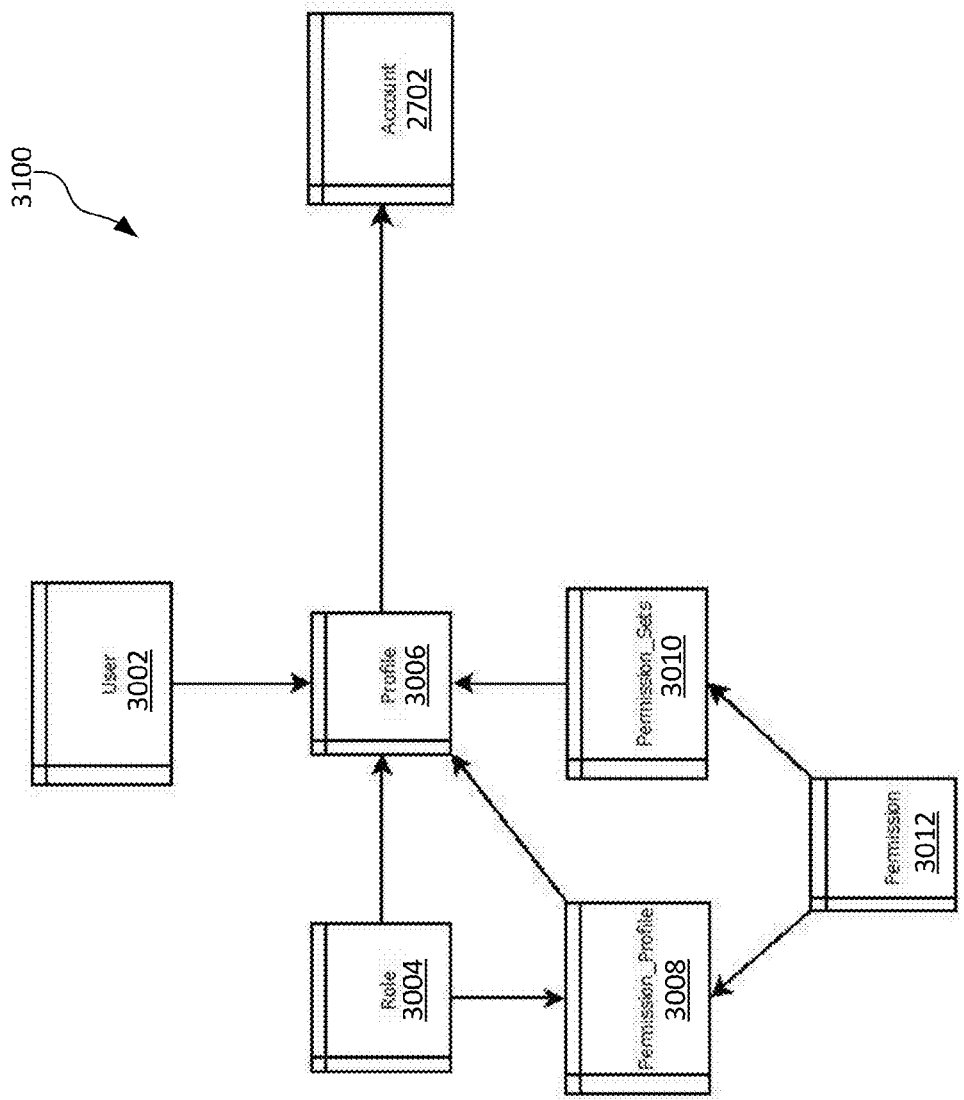
FIG. 31 illustrates an example user profile being linked to the user the role, and both the permissions profile and permissions sets, according to an example embodiment.

FIG. 30 illustrates an arrangement 3000 by which the various users of the system can have roles assigned. In the example arrangement shown, a user 3002 is assigned a role 3004, and a profile 3006 is developed for that user. The profile 3006 is associated with a permissions profile 3008, which receives a default permissions set 3010 and any special-purpose permissions 3012 that may be provided to that user. In particular, as shown in FIG. 31, the user profile 3006 is linked to the user (e.g., any of users 2702a-g) the role 3004, and both the permissions profile 3008 and permissions sets 3010. Permissions 3012 are provided to one or both of the permissions profile 3008 and permissions sets 3010, and the profile allows defined access to an account 2702, which represents the portal by which access to the player development profile is accomplished.

Figure 32:
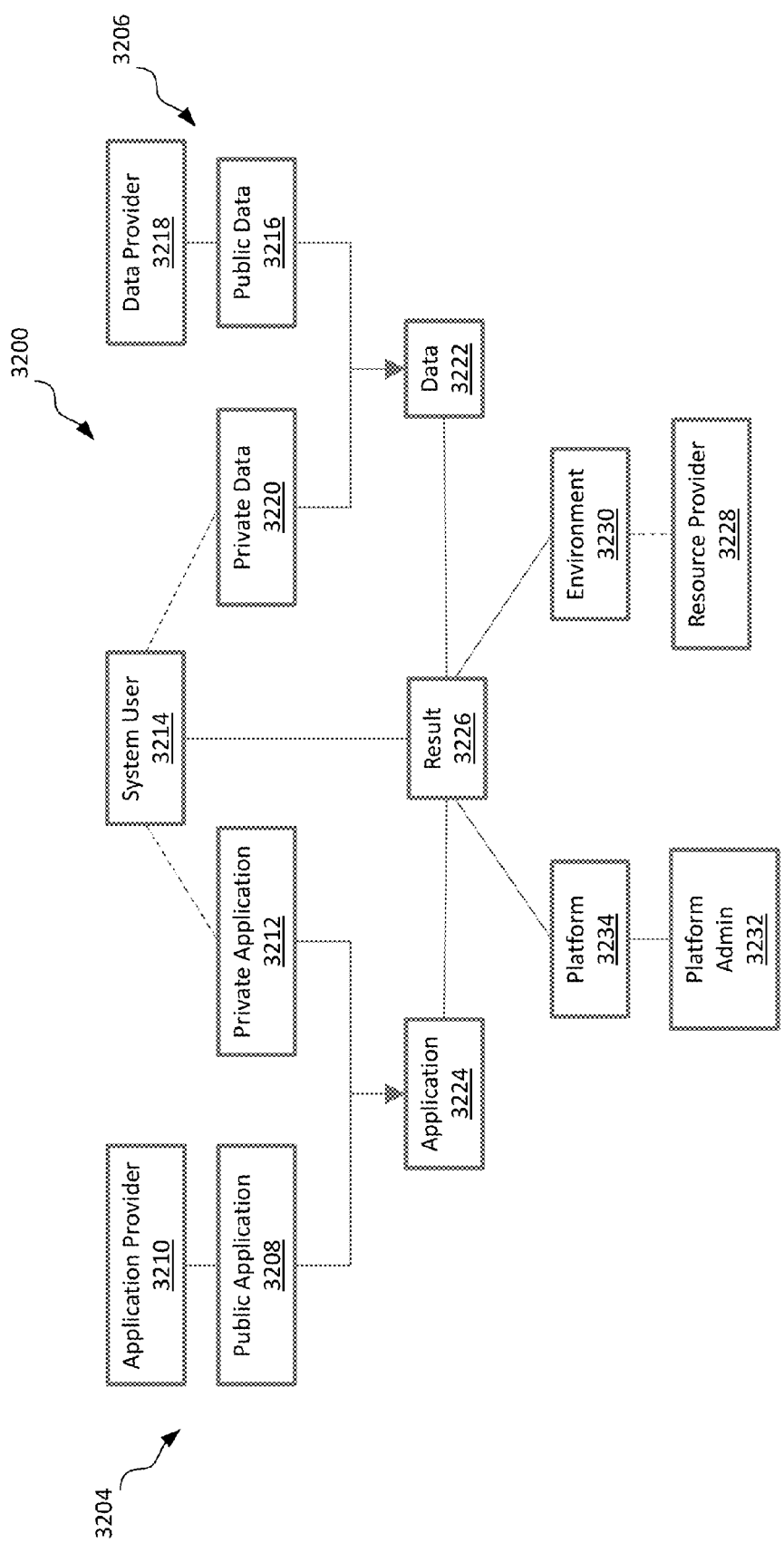
FIG. 32 illustrates a block diagram of internal and external interfaces to a player development system, according to an example embodiment.

FIG. 32 illustrates a player development system 3200 which illustrates an alternative embodiment of the present disclosure. The depicted embodiment shows a player development system 3200 that is configured to interface with external application 3204 and data sources 3206. The external application sources 3204 can include a public application 3208 supplied by an application provider 3210. The public application 3208 can be configured to work with a private application 3212 being run by the system user 3214. The private application 3212 can be a local application or a player deployment application as described in FIG. 3 above. The external data sources 3206 can include a public data source 3216 supplied by a data provider 3218. The public data 3216 can be combined with private data 3220 of the system user 3214 to create the player development record 3222. Accordingly, the combination of the private application 3212 and public application 3208, depicted as application 3224, can be configured to analyze the player development record 3222 to create a result at 3226. In some embodiments, the result 3226 can be a player development profile. In other embodiments, the result can be any result where the application 3224 performs an analysis on the player development record 3222.

The player development system 3200 can also be provided data via an external resource provider 3228. The external resource provider 3228 can be a system user with system 3200 access. For example, the resource provider 3228 can be a tennis federation given access to upload certain data to the player development system 3200 (e.g. schedules, results, etc.). Accordingly, this resource provider data can be introduced the player development system 3200 via computing environment 3230 and be used in the player development system 3200 to help create the result 3226. Additionally, a project administer 3232 can also be integrated to the player development system 3200, providing input to the overall system platform 3234. Such input may change the way the player development system 3200 behaves, thereby affecting the result 3226.

Accordingly, and referring to FIGS. 27-32 generally, each of the users associated with a particular player development profile can have different roles and rights, but access and view or edit different aspects of the player development profile for a player to which that user has access. Therefore, across all detailed practice, training, therapy, or other events, data can be captured to provide a fuller understanding of a player's career and development, while at the same time ensuring that the users have only those rights to aspects of a player development profile to which they are authorized.

Referring generally to the systems and methods of FIGS. 1-32 and referring to in particular computing systems embodying the methods and systems of the present disclosure, it is noted that various computing systems can be used to perform the processes disclosed herein. The advantages of the player development system disclosed herein include an organized system, a plurality of generated helpful recommendations and comparisons, and a large amount of varied and detailed system data of which can be inner correlated.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media. Further, the disclosed methods' stages may be modified in any manner, including by reordering stages and/or inserting or deleting stages, without departing from the overall concept of the present disclosure.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method for assisting in player development, the method comprising:
   receiving input data from a first user at a server computing system;
   storing the input data associated with a player development record in a player development database communicatively connected to the server computing system, the player development database storing a plurality of player development records, each player development record aggregating player data over time and each player development record including at least training data, competition data, and biographic data;
   receiving a request at the server computing system to generate a player development profile for a particular player based on the player development record;
   generating a player development profile by way of an automated player performance application evaluated at the server computing system, the player development profile being based at least in part on performance trends in the player development record;

obtaining an aggregate data set for a relevant player population at the server computing system;

formulating an aspirational player model, the aspirational player model including a projected player development record extrapolated from the aggregate data set for the relevant player population; and generating a training recommendation based on one or more differences between the player development profile and the aspirational player model.

2. The method of claim 1, further comprising displaying the player development profile that is automatically generated by the automated player performance application.

3. The method of claim 1, wherein the training recommendation is based at least in part on the identity of a user requesting the player development profile.

4. The method of claim 1, wherein the training recommendation is based at least in part on past performance data.

5. A system for assisting in player development, the system comprising:

a server maintaining a database including a plurality of player development records, each player development record including at least training data, competition data, and biographic data; and an application hosted by the server, the application including a user interface and an automated player performance application, the automated player performance application being configured to generate a player development profile for display in the user interface, the player development profile being based at least in part on performance trends in the player development record, the automated player performance application further formulating an aspirational player model, the aspirational player model including a projected player development record extrapolated from the plurality of player development records and generating a training recommendation based on one or more differences between the player development profile and the aspirational player model.

6. The system of claim 5, wherein the user interface of the application is configured to receive identification and login information associated with a user account.

7. The system of claim 5, further comprising an output display signal including a command to display the player development profile and training recommendation that is automatically generated by the automated player performance application.

8. The system of claim 5, wherein the data included in the player development record includes one or more data categories, the data categories selected from the group consisting of education data, team data, competitor data, shopping data, entertainment data, competition schedule data, competition results data, expense data, travel data, training data, nutrition data, medical data, social media data, public media data, sponsorship data, licensing data, research and development data, multimedia data, employment data, hobby data, interest data, player ranking data, and philanthropic data.

9. The system of claim 5, wherein the training recommendation includes a nutritional recommendation.

10. The system of claim 5, wherein the training recommendation includes a comparison of past performance of a player.

11. The system of claim 5, wherein the training recommendation includes a past performance comparison between multiple players.

12. The system of claim 5, wherein the training recommendation includes an equipment recommendation.

13. The system of claim 5, wherein the training recommendation includes a travel plan recommendation.

14. The system of claim 13, wherein the travel plan recommendation is based at least in part on a travel budget, past expense data, and projected future expense data.

15. The system of claim 5, wherein the training recommendation is based at least in part on past performance data.

16. A method for assisting in player development, the method comprising:

registering a player with a web based player development service hosted by the server computing system;

tracking player development records using the web based player development service, thereby forming an aggregate record at the web based player development service, each player development record including at least training data, competition data, and biographic data;

requesting a player development profile for a particular player from the web based player development service, the player development profile being based at least in part on performance trends in the player development record;

viewing the player development profile that is generated by an automated player performance application of the web based player development service the automated player performance application executed on the server computing system; and viewing, via the web based player development service, a training recommendation generated by an automated player performance application based on one or more differences between the player development profile and an aspirational player model, the aspirational player model including a projected player development record extrapolated from the player development records.

17. The method of claim 16, wherein the player development profile is automatically generated by the automated player performance application of the web based development service.

18. The method of claim 16, wherein the web based player development service is configured to receive identification and login information associated with a user account.

19. The method of claim 16, wherein the data included in the player development profile is based at least in part on the identity of a user requesting the player development profile.

20. The method of claim 19, wherein the user is a player and the player development profile includes a scholarship status overview.

21. The method of claim 19, wherein the user is a coach and the player development profile includes a skills training plan.

22. The method of claim 19, wherein the user is a player representative and the player development profile includes a sponsorship plan.

23. The method of claim 19, wherein the user is a trainer and the player development profile includes a conditioning plan.

24. The method of claim 19, wherein the user is a trainer and the player development profile includes a nutritional plan.

25. The method of claim 19, wherein the user is a trainer and the player development profile includes an academic plan.

* * * * *